US011429290B2

(12) United States Patent
Nortman

(10) Patent No.: US 11,429,290 B2
(45) Date of Patent: Aug. 30, 2022

(54) METHODS AND SYSTEMS FOR PROVIDING A LOCKLESS ACCESS TO A SHARED MEMORY REGION IN A PUBLISH AND SUBSCRIBE SYSTEM

(71) Applicant: Argo AI, LLC, Pittsburgh, PA (US)

(72) Inventor: Randall Nortman, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 43 days.

(21) Appl. No.: 17/097,590

(22) Filed: Nov. 13, 2020

(65) Prior Publication Data

US 2022/0155975 A1    May 19, 2022

(51) Int. Cl.
  *G06F 3/06*    (2006.01)

(52) U.S. Cl.
  CPC ......... *G06F 3/0622* (2013.01); *G06F 3/0655* (2013.01); *G06F 3/0679* (2013.01)

(58) Field of Classification Search
  CPC .... G06F 3/0611; G06F 3/0622; G06F 3/0623; G06F 3/0655; G06F 3/0656; G06F 3/0671; G06F 3/0673; G06F 3/0679; G06F 3/0683; G06F 5/065; G06F 5/10
  USPC ...................... 710/52, 53; 711/147, 148, 150
  See application file for complete search history.

(56) References Cited

U.S. PATENT DOCUMENTS

| | | | |
|---|---|---|---|
| 7,193,994 B1 * | 3/2007 | Payson | H04L 7/02 370/380 |
| 7,389,325 B2 | 6/2008 | Roberts | |
| 7,620,753 B1 | 11/2009 | Beaman et al. | |
| 8,065,442 B1 | 11/2011 | Chatterjee et al. | |
| 8,095,727 B2 | 1/2012 | Rushworth et al. | |
| 8,165,992 B2 | 4/2012 | Rooney | |
| 8,738,704 B2 | 5/2014 | Stark et al. | |
| 9,304,896 B2 | 4/2016 | Chandra et al. | |
| 9,843,640 B2 | 12/2017 | Walkin et al. | |
| 10,572,405 B1 * | 2/2020 | Shen | B60R 16/0231 |
| 10,785,296 B1 | 9/2020 | Allison | |
| 11,178,091 B1 | 11/2021 | Madhavan et al. | |
| 2006/0236011 A1 * | 10/2006 | Narad | G06F 5/10 710/240 |
| 2008/0270744 A1 | 10/2008 | Hashimoto | |
| 2011/0016316 A1 | 1/2011 | Amir et al. | |
| 2012/0102282 A1 | 4/2012 | Richards | |

(Continued)

OTHER PUBLICATIONS

Information about Related Patents and Patent Applications, see section 6 of the accompanying Information Disclosure Statement Letter, which concerns Related Patents and Patent Applications.

(Continued)

*Primary Examiner* — Gary J Portka

(74) *Attorney, Agent, or Firm* — Fox Rothschild LLP

(57) ABSTRACT

Systems and methods for providing lockless access to a buffer ring are disclosed. The systems include a shared memory comprising the buffer ring. The buffer ring includes a plurality of sequentially arranged fixed size buffers configured to store messages, and a global header comprising a counter and a lock. The systems further include a publisher configured to write a plurality of messages to the plurality of fixed sized buffers in the buffer ring, and a subscriber configured to read one or more of the plurality of messages written by the publisher. The counter provides information relating to a fixed size buffer in the buffer ring to which the publisher will next write a message.

34 Claims, 9 Drawing Sheets

(56) References Cited

U.S. PATENT DOCUMENTS

| | | |
|---|---|---|
| 2013/0097369 A1 | 4/2013 | Talagala et al. |
| 2013/0173747 A1 | 7/2013 | Kim et al. |
| 2018/0069810 A1 | 3/2018 | Hafri |
| 2018/0352566 A1 | 12/2018 | Hong et al. |
| 2019/0155529 A1 | 5/2019 | Linke |
| 2019/0335010 A1 | 10/2019 | Milyakov |
| 2020/0034214 A1* | 1/2020 | Vanco .................. G06F 9/5005 |
| 2020/0310995 A1 | 10/2020 | Shen et al. |

OTHER PUBLICATIONS

Kim, K. H., Colmenares, J. A., & Rim, K. W. (May 2007). Efficient adaptations of the non-blocking buffer for event message communication between real-time threads. In 10th IEEE International Symposium on Object and Component-Oriented Real-Time Distributed Computing (ISORC'07) (pp. 29-40) (abstract).

U.S. Appl. No. 17/097,671, filed Nov. 13, 2020, Methods and Systems for Memory Management in a Publish and Subscribe System.

U.S. Appl. No. 14/097,699, filed Nov. 13, 2020, Methods and Systems for Enabling Publish-Subscribe Message Transmission in a Distributed Environment.

* cited by examiner

METHODS AND SYSTEMS FOR PROVIDING A LOCKLESS ACCESS TO A SHARED MEMORY REGION IN A PUBLISH AND SUBSCRIBE SYSTEM

BACKGROUND

Robots may require processing of information from various sources to interact with environments. Certain robotic applications have high bandwidth requirements and strict synchronization, latency, and reliability requirements for communications. For example, robotic systems such as autonomous vehicles (AVs) require low-latency to transmit control and feedback signals in real time because ideally there should be as little lag as possible between, for example, receiving sensor input and corresponding vehicle operation. AVs are sophisticated systems, which contain many different control systems or modules for controlling the various functions of the vehicle. For synchronized, low-latency, and reliable operation of an AV, information from various modules must be collected and analyzed in real time with very low latency in order to navigate the vehicle and/or to identify and react to faults. Specifically, information between various modules must be exchanges in an efficient and coordinated manner.

As the number of modules increase and the tasks become more complicated, the amount of information exchanged between the modules also increases. One way to manage the increased number of processing modules and the increased amount of information exchanged is a publish-subscribe architecture based system. In a publish-subscribe system, information from a source is not sent directly to a receiving module. Instead, the information from a source is stored and made accessible (i.e., published) on a shared repository. The receiving module subscribes to the published information from the shared repository. The receiving module may also publish information on the shared repository that may be subscribed by other modules. Often, a publisher (or writer) is producing (writing) data and a subscriber (or reader) is consuming (reading) this data and/or operating on the data in these real-time systems. The subscriber may not need all the data produced—it just needs to get the "latest" or most current data. In order to meet performance goals, however, neither the publisher nor the subscriber should be "blocked" or kept waiting for the other (or any other task) to complete before gaining access to data.

Access to data that has been written in such publish/subscribe systems may involve accessing shared memory that stores the shared repository in a computing environment. Known solutions include using buffer ring type shared repository. A buffer ring is a contiguous array of data cells which can contain arbitrary data. A buffer ring is limited in size to a fixed number of data cells. There are disadvantages to this approach, as it requires the consumer to read and discard multiple items to get to the latest, i.e., the most relevant, data. This approach incurs a not insignificant performance hit. Further, the buffer must be sufficiently deep to allow the writer to always have room to write, and this assumes that the reader and writer run at a same fixed rate and not where one is significantly faster (or slower) than the other. Constructing scalable applications that can do so is increasingly challenging as the number of nodes grows, and this is exacerbated by other issues, such as the increasing latency gap between "local" and "remote" resources in a distributed system. Transmission of data between network nodes may add latency, network congestion, and other issues.

This document describes methods and systems that are directed to addressing the problems described above, and/or other issues.

SUMMARY

In various scenarios, systems and methods for providing lockless access to a buffer ring. The system may execute the methods and may include a shared memory including the buffer ring. The buffer ring may include a plurality of sequentially arranged fixed size buffers configured to store messages, and a global header comprising a counter and a lock. The system may also include a publisher configured to write a plurality of messages to the plurality of fixed sized buffers in the buffer ring, and a subscriber configured to read one or more of the plurality of messages written by the publisher. The counter may provide information relating to a fixed size buffer in the buffer ring to which the publisher will next write a message. Optionally, each of the plurality of messages may have a finite size.

In various implementations, a negative value of the counter may be indicative of a state of the system in which the buffer ring does not include any messages. Optionally, the publisher may assign a value of 0 to the counter upon completion of a first write to the ring buffer. The publisher may then increase the value of the counter after each subsequent operation such that an index of the fixed size buffer in the buffer ring to which the publisher most recently wrote a message is determined by dividing a value of the counter by 2.

In certain implementations, the lock may be acquired by the publisher before executing a write to one of the plurality of fixed size buffers, and released after execution of the write. Optionally, the system may include a plurality of publishers that can each be configured to write one or more messages to the plurality of fixed sized buffers in the buffer ring such that the lock can be acquired by a single one of the plurality of publishers at any given time.

In certain implementations, the plurality of fixed size buffers may not share cache lines with each other in the shared memory.

In various implementations, each buffer may include a buffer header configured to store at least one of the following: a buffer index number, synchronization information, or buffer state information. Optionally, the buffer header may occupy a unique cache line in the shared memory. Additionally and/or alternatively, each buffer may also include a data region that starts in a cache line of the shared memory immediately following the unique cache line of a corresponding buffer header.

Optionally, a size of the plurality of fixed size zones may be determined based on, for example, maximum message size, maximum number of fixed size zones, or alignment.

In one or more implementations, the shared memory may also include a synchronization data storage region corresponding to each of the plurality of fixed sized size buffers that includes a buffer counter indicative of an accuracy of a message read from that fixed size buffer by the subscriber. A memory address of the synchronization data storage region may be included in a buffer header of that fixed sized buffer. An initial value of the buffer counter may be set to 0, and the publisher may increment a value of the buffer counter after the execution of a write to the corresponding buffer. This allows the subscriber to compare a first value of the buffer counter before execution of a read from that fixed size buffer with a second value of the buffer counter after execution of the read from that fixed size buffer, and discard a message read from that fixed size buffer if the first value does not match the second value. In such cases, a value of the buffer counter is odd during execution of a write to that fixed sized buffer by the publisher. The subscriber may be configured to wait for a notification of completion of the write being executed when the value of the buffer counter is odd before executing a read on that fixed size buffer. Additionally and/or alternatively, the data synchronization region may also include a futex system call that is configured to send a new message notification to the subscriber when a value of the buffer counter increments by 2 and is even. Optionally, the data synchronization region may include a futex system call that is configured to send a wait notification to the subscriber when a value of the buffer counter is either odd or has not incremented. The futex system call may also send a wait notification to a plurality of publishers in the system when a value of the buffer counter is odd.

In some other scenarios, systems (including processors) and methods for enabling message transfer between a publisher and a subscriber. The methods may include generating a data structure comprising a buffer ring in a shared memory. The buffer ring may include a plurality of sequentially arranged fixed size buffers configured to store messages, and a global header that may include a seqlock. The seqlock may include a seqlock counter that provides information relating to a fixed size buffer in the buffer ring to which the publisher will next write a message. The methods may also include generating a synchronization data storage region corresponding to each of the plurality of fixed sized size buffers that may include a buffer counter that indicates accuracy of a message read from that fixed size buffer by the subscriber.

In various implementations, a negative value of the counter may be indicative of a state of the system in which the buffer ring does not include any messages. Optionally, the publisher may assign a value of 0 to the counter upon completion of a first write to the ring buffer. The publisher may then increase the value of the counter after each subsequent operation such that an index of the fixed size buffer in the buffer ring to which the publisher most recently wrote a message is determined by dividing a value of the counter by 2.

In certain implementations, the lock may be acquired by the publisher before executing a write to one of the plurality of fixed size buffers, and released after execution of the write.

Optionally, the plurality of fixed size buffers are generated such that they do not share cache lines with each other in the shared memory.

An initial value of the buffer counter may be set to 0, and the publisher may increment a value of the buffer counter after the execution of a write to the corresponding buffer. This allows the subscriber to compare a first value of the buffer counter before execution of a read from that fixed size buffer with a second value of the buffer counter after execution of the read from that fixed size buffer, and discard a message read from that fixed size buffer if the first value does not match the second value. In such cases, a value of the buffer counter is odd during execution of a write to that fixed sized buffer by the publisher.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Together the shared memory and communication network embodiments of this disclosure may be used to implement a multiprocessing and distributed computing environment in a robotic system such as an autonomous vehicle. Such robotic system may support the Portable Operating System Interface (POSIX) threads standard, and other shared memory multithreading programming models, and may be implemented on an operating system ("OS") (e.g., Linux, Unix, etc.). One embodiment of the present disclosure may enable a memory broker to boot itself upon unexpected crash or abnormal termination.

Figure 1:
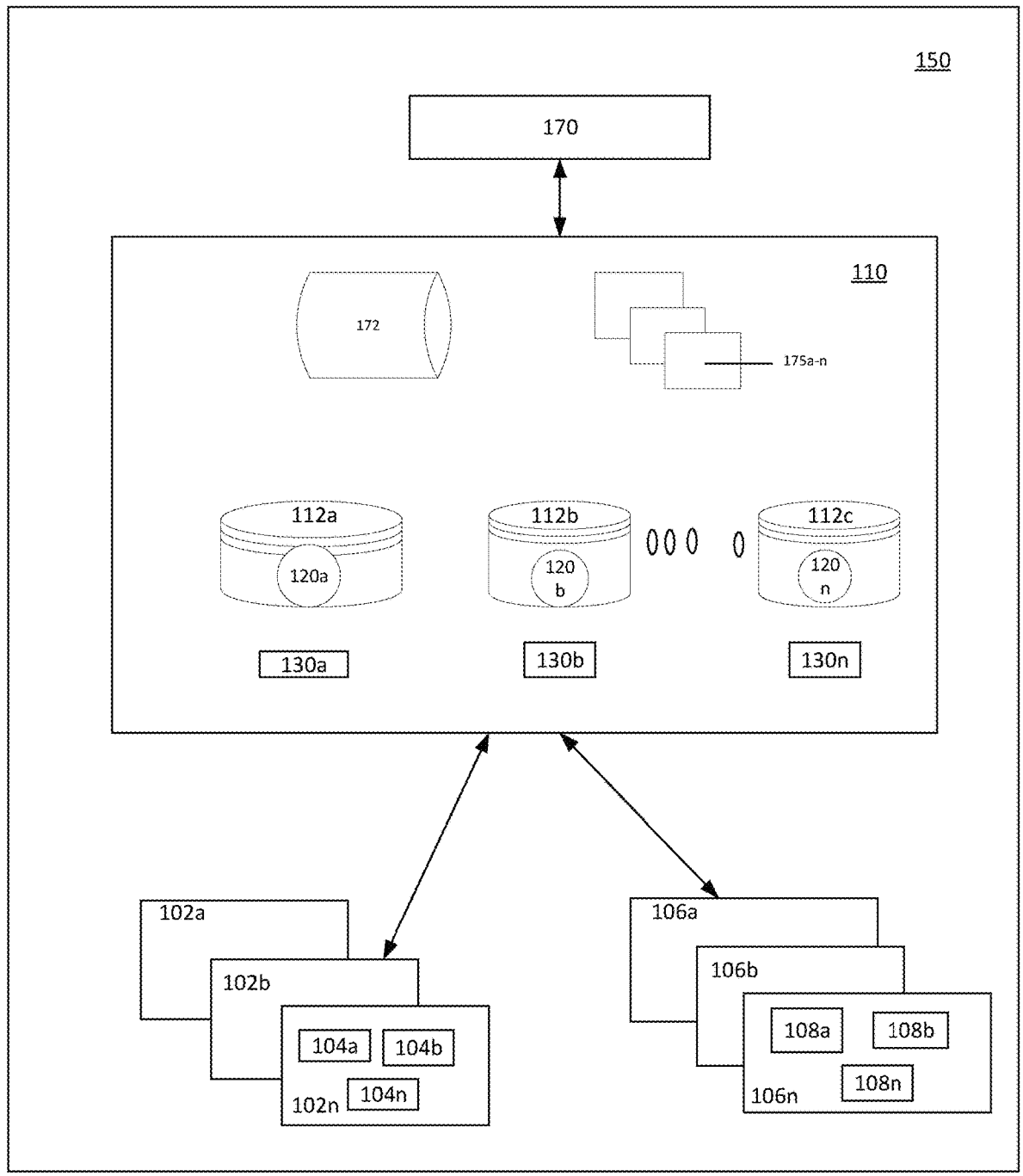
FIG. 1 illustrates a schematic illustration of a publish/subscribe data communications system.

FIG. 1 shows a schematic illustration of a publish/subscribe data communications system 150 for use in a robotic system in accordance with one embodiment of the current disclosure. In certain embodiments, the robotic system may be an autonomous vehicle.

As shown in FIG. 1, one or more threads or computer processes 102a-n, each including one or more publishers 104a-n, may have communicative access to a shared memory 110 included in a non-transitory computer-readable storage medium and/or as a virtual memory instance. Additionally one or more threads or computer processes 106a-n, each including one or more subscribers 108a-n, may also has access to the shared memory 110. In this sense, each process 102, 106, publisher 104, and subscriber 108 may have access to the shared memory 110. While some processes are illustrated showing only respective publisher or subscribers, embodiments of the disclosure may include processes, that include a combination of publishers and/or subscribers within a single process. As used herein, each publisher 104a-n and/or each publisher process 102a-n may be considered a "writer" for accessing data in the shared memory 110, and each subscriber 108a-n and/or each subscriber process 106a-n may be considered a "reader" for accessing data in the shared memory 110. Publishers and subscribers may collectively be called "peers" in this disclosure.

As used herein, "programs" and/or "processes" may include all or a portion of a computer program having an executable instruction set for controlling the management and/or operation of at least one of the respective publisher 104a-n, subscriber 108a-n, or functions of the robotic system using the data communications system 150. The program and/or processes may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc., that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, controller, or special purpose processing machine to perform a certain function or group of functions.

The data communications system 150 may include a system bus or other computing system communicative components (not shown here) to facilitate communications between the publishers 104a-n, shared memory, subscribers 108a-n, or other components of the system. For example, the publishers 104a-n and subscribers 108a-n may communicate with each other by passing data through the shared memory 110, via a channel. A channel can include, for example, a related set of logical multicast connections implemented in a distributed manner, and may include a collection of network resources used to serve a community of publishers and subscribers exchanging messages. The messages may be classified according to the channel subject namespace. Various channel resources may be managed, controlled, and provisioned using known methods such as via channel services provided by channel managers. Multiple channels may share the same resources. Channels can provide a highly scalable directory service such as, but not limited to, the following examples: publisher and subscriber information, authentication and authorization information, message types, etc. The channels facilitate content-based routing by providing logical configurations for particular types of content and thus providing a context for attributes transmitted over the channels.

The publishers 104a-n and/or subscribers 108a-n may be operably coupled with the memory 110 such that the publishers 104a-n and/or subscribers 108a-n, or any computer programs or processes thereon, may access at least a portion of the memory 110.

Each process 102a-n, 106a-n accessing the shared memory 110 can be treated as equals, where every process has equal rights to read, write, extend and shrink the shared memory 110. Alternatively, processes 102a-n and 106a-n accessing the shared memory can also work in the client server/mode, where one process (server) typically has more rights than the client. Typically in this mode, the server process has rights to read, write, extend, and shrink the memory 110, while client processes can only read and write the memory 110. For example, in a POSIX environment where processes use system calls to request services from the POSIX operating system (OS), the process that requests the OS to designate an area of memory as shared memory is called the server. All other processes that use the allocated shared memory are clients. Thus, the designation of a process as client or server depends on the relationship of the process to the allocation and use of the shared memory.

The data communications network 150 shown in FIG. 1 is merely a schematic representation of one embodiment where a plurality of publishers 104a-n and subscribers 108a-n may or may not be located on the same computing system of the robotic system. The exact location of the publishers 104a-n and subscribers 108a-n are not germane to the implementations of this disclosure. Additionally, more or fewer publishers 104a-n and/or subscribers 108a-n may be included in various implementations of this disclosure.

As will be understood by one of ordinary skill in the art, the storage medium may include a non-transitory computer readable medium, such as random access memory (RAM), a read-only memory (ROM), an erasable programmable read-only memory (EPROM or Flash memory), or any other suitable medium. Shared memory 110 may include a number of addressable memory locations for storing data. Data may be written into shared memory 110 by publishers 104a-n and data may be read from shared memory 110 by subscribers 108a-n.

For a process to access shared memory, the shared memory must be mapped into the processes address space. In certain embodiments, the shared memory 110 may be mapped by a memory management call (mmap) provided by a kernel. An "mmap" system call maps the specified memory in the address space of calling process. In a POSIX environment the server process uses the system call "mmap( )" to establish a mapping between a range of the addresses in the address space of the process and a portion of some "memory object". Before mapping a data structure to memory the process first uses the open( ) system call to obtain a file descriptor for the data structure. The mmap( ) system call takes several parameters including the address in the address space that the file is to be mapped to, a protection argument to specify read, write, and execute permissions, a flag to specify whether the data structure is shared or private, and the file descriptor obtained with the open( ) system call. The mmap( ) system call returns a pointer to the start of the mapped data.

The memory 110 is further sub-divided into memory regions 112a-n, each memory region comprising an allocation of data into at least one grouping, or "topic", positioned at a predetermined addressable memory location. As used herein, a memory region 112a-n may include a subset of memory 110 allocated for a particular utilization of data storage for the robotic system relating to a topic. Message topics typically provide the key to the delivery of messages between publishers and subscribers. For example, a topic may include a single allocation of data, such as speed data, pose data, sensor data (e.g., LiDAR sensor data, camera sensor data, etc.), location data, or it may comprise a plurality of related or unrelated data elements, such as waypoints or the current trajectory of the robotic system. As shown, the memory regions 112a-n may be arrayed in a sequential fashion; however, additional organization structures of the memory regions 112a-n may be configured to include matrices, variable allocations for each memory region 112a-n, etc. In certain embodiments, each memory region 112a-n may be associated with a name and such name is stored in at least a temporary data storage 172 that may be preserved across reboots, crashes, etc. (e.g., /dev/shm virtual file storage in a Linux OS). For example, a memory broker 170 (discussed below in detail) may create the memory regions 112a-n and associate each region with a name. A process and/or a user can access a memory region using the assigned names.

Each of the processes 102a-n, 106a-n, and/or respectively, the publishers 104a-n and the subscribers 108a-n may receive address(es) of the memory regions 112a-n from a memory broker 170 (as discussed below). In this sense, each process 102a-n, 106a-n, publishers 104a-n, and/or subscriber 108a-n may identify the one or more memory regions 112a-n that store data relating to the corresponding topics.

In one embodiment, the number of memory regions 112a-n in the shared memory 110 may be predefined during the initialization of the memory 110, based on a known number of topics accessible to the publishers and/or subscribers with at least one memory region for each topic. In another embodiment, the number of memory regions 112a-n may be defined at or during runtime (by, for example, the memory broker 170) by the number of topics accessible by the publishers and/or subscribers with at least one memory region for each topic. In this sense, the number of topics may be dynamic, increasing and decreasing as needed, or only additive when additional topics need to be accessed.

In certain embodiments, a memory region 112a-n may include a buffer ring 120a-n including a plurality of discrete fixed-size buffers. Each buffer may be configured to store a predetermined amount of data. As used herein, the term "message" refers to a data element written to a buffer of a memory region, and that has a size less than or equal to the fixed size of the buffer. Optionally, the size of a buffer may be determined to be equal to the maximum allowed size of a message, and only one message may be stored in a buffer at a particular time. In various implementations of this disclosure, publishers write messages to a buffer ring by inserting data sequentially into successive buffers of the buffer ring. The messages written in the buffers of a buffer ring are read by subscribers which may or may not read the buffers in order, i.e., the subscribers may skip buffers and read them out of sequence while performing a read operation. The key defining characteristic that makes a collection of buffers a "buffer ring" is the fact that, on reaching the last element of the array, the publisher then independently loops back to the beginning of the array to overwrite the oldest buffer. Thus, a buffer ring can be thought of as an endless loop with the subscriber tracking behind the publisher. This arrangement creates the effect of the publisher going around and around a ring of buffers, even though in terms of memory address locations the "ring" is discontinuous between the last and first buffer. This fact is largely hidden from users of the buffer ring in a memory region. The buffer ring of the current disclosure is lockless in the sense that a publisher is never blocked by subscribers from writing to a buffer of the buffer ring, and the subscribers detect corrupted reads, as discussed below. Corrupted reads may be detected but not prevented favoring low latency over reliability.

Each memory region may only include one buffer ring. It should be noted that there may be a unique name or ID associated with each buffer ring, and there is a defined relationship between memory region name and corresponding name/ID of the buffer ring included in that memory region. Since each memory region may only include one buffer ring, buffer ring ID may be derived from the corresponding memory region name (or vice versa).

Other storage configurations included in the memory regions 112a-n are within the scope of this disclosure such as, without limitation, a memory region comprising a plurality of buffers arranged contiguously and sequentially in memory.

Figure 2:
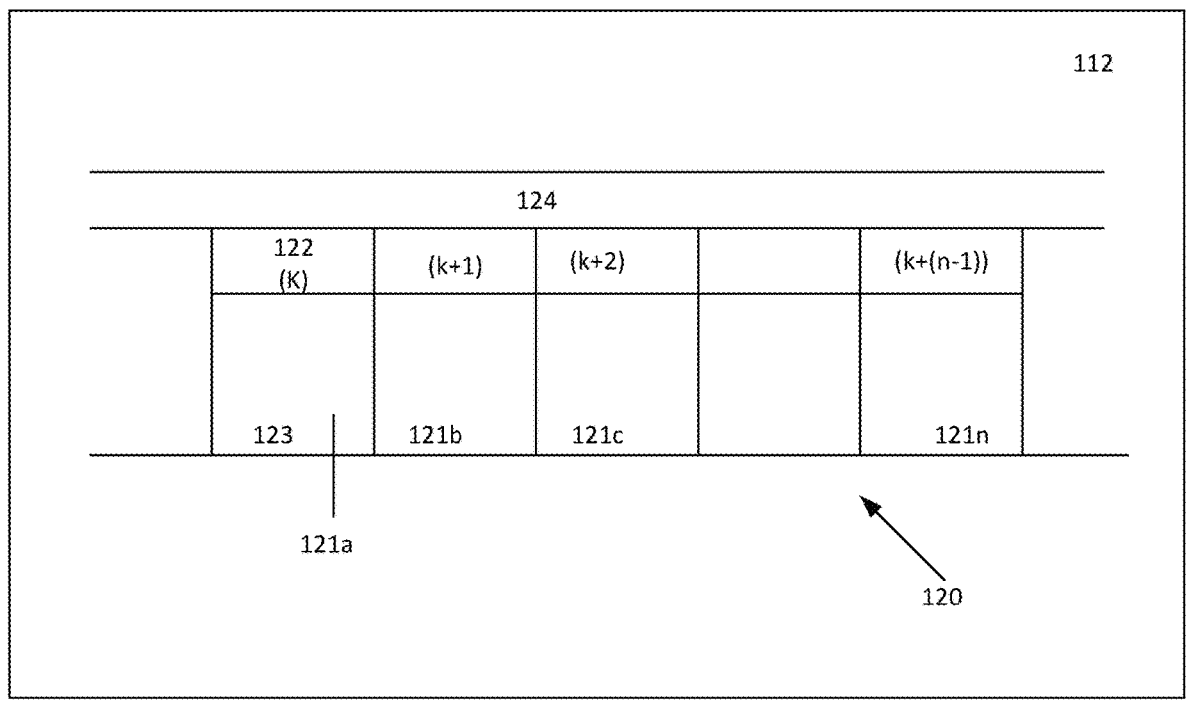
FIG. 2 is a schematic illustration of an example buffer ring.

Referring now to FIG. 2, a buffer ring 120 included in a memory region 112 comprising a sequential array plurality of buffers 121a-n is shown where each of the buffers 121a-n is configured to store a predetermined amount of data (i.e., a message). In such a buffer ring 120, the number of buffers and the size of each buffer may be determined at initialization and may not be changed subsequently (discussed below). For example, a buffer ring 120 for storing data relating to pose of the robotic system may have a first predetermined number of buffers, each configured to store a message including a first number of bytes. In another example, a buffer ring 120 for storing data relating to trajectory data may have a second predetermined number of buffers, each configured to store a message including a second number of bytes. The fixed size and number allocation of buffers in a memory region allows for predictable and stable memory utilization which is important in robotic systems because it requires finite-sized messages (data stored in each buffer) for memory read/write operation. Specifically, fixed size allocation and number allocation of buffers in a memory region creates a finite-sized "queue" of messages available to subscribers to read at any given time, stored in sequential buffers of a buffer ring. The subscriber may proceed sequentially to read the message or may randomly select a message in the queue without the need for pointers (as discussed below). It should be noted that as shown in FIG. 2, the buffer ring does not necessarily include a ring configuration of the fixed size buffers.

Since a buffer ring is divided into fixed-size buffers, each buffer holding one message enabling fast random access to the ring, a subscriber may also efficiently inspect each message in the buffer ring and decide which message are relevant. Existing memory configurations store messages as variably-sized entities within a continuous sequence of bytes with message framing to distinguish messages which, in turn, requires parsing of at least the message framing in order to skip over messages, and in general do not support any kind of random access.

Figure 3:
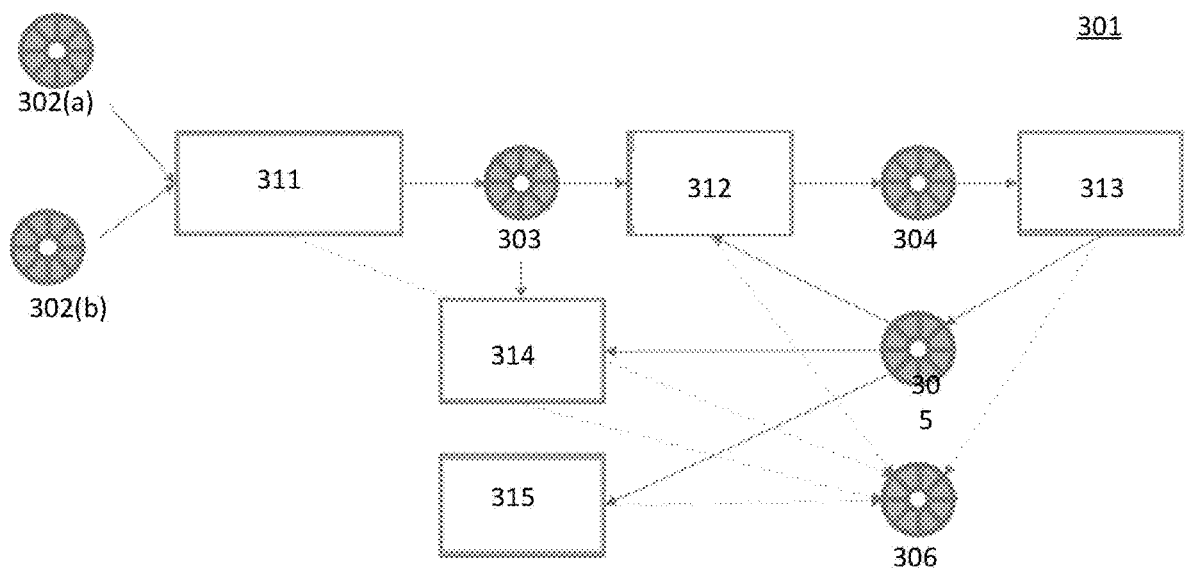
FIG. 3 is a schematic illustration of an example communications channel.

It should be noted that each memory region 112a-n may only include one buffer ring 120. Multiple publishers may write messages to a buffer ring, and multiple subscribers may read data from a buffer ring. Optionally, a single publisher may write messages to a buffer ring, and one or more subscribers may read data from a buffer ring. Channels discussed above have a one-to-may relationship with buffer rings. Specifically, each buffer ring belongs to one channel, but each channel for a topic may include many buffer rings. For example, if multiple publishers are publishing data relating to a topic (e.g., topic=shape data, publishers=camera, LiDAR, or other sensors in a vehicle), the channel may include multiple buffer rings, each corresponding to a publisher. In another example, as shown in FIG. 3, a channel 301 may be created in an autonomous vehicle corresponding to the topic "pose estimation," where "pose" of a vehicle is the location of the vehicle in either two or three dimensions, along with its orientation. The channel 301 may include buffer rings 302(a) and 302(b) that store raw data collected by a LiDAR sensor, buffer ring 303 that stores data relating to processed LiDAR data, buffer ring 304 that stores data relating to observed poses, buffer ring 305 that stores data relating to filtered poses, and buffer ring 306 for storing debugging logs. LiDAR sensors (not shown here) are publishers to buffer rings 302(a) and 302(b), and a LiDAR data processing system 311 (e.g., sweep accumulator system) may subscribe to data written to buffer rings 302(a) and 302(b). The LiDAR data processing system 311 processes data read from buffer rings 302(a) and 302(b) and publishes it to buffer ring 303. LiDAR data subscribers such as a scan matcher 312 may subscriber to data in buffer ring 303 to extract observed pose data from the LiDAR data. The observed pose data may be published by the scan matcher 312 to buffer ring 304 for storage. A pose filter 313 may subscribe to the buffer ring 304 and publish filtered pose data to buffer ring 305. Multiple subscribers (such as a tracker 314, scan matcher 312, and/or other systems) may subscribe to filtered pose. While buffer rings 302(a), 302(b), 303, 304, and 305 are associated with a single publisher; some buffer rings 306 may receive data from multiple publishers. For example, a buffer ring for storage of debugging logs may receive data from various systems.

Referring back to FIG. 2, each buffer 121a-n of a buffer ring 120 may include a header 122 and a data portion 123. The header 122 may include sequence or index numbers "k.", synchronization information, and/or state information (i.e., empty, filled, containing the most recent data, or the like) for the corresponding buffer. Synchronization information may include information for identifying a memory location (e.g., a memory address, memory pointer, name of the memory region, location of the buffer, etc.) in the shared memory 110 that stores synchronization data relating to read and write operation(s) for that buffer (discussed below). The data portion 123 may be configured to store a message. It should be noted that the data storage capacity of a buffer is more than the size of a message on account of the size of the header.

In certain embodiments, the header occupies its own central processing unit (CPU) cache line in the memory region 112a-n. This eliminates "false sharing" between distinct buffers, which improves performance, and concurrency on multi-core CPUs and multi-CPU systems with a minimum of memory bandwidth utilization and cache coherency overhead. The data portion 123 of a buffer may start in a cache line immediately following the cache line for the header 122 (or within a predefined number of cache lines). This allows the CPU to efficiently pre-fetch main memory into cache memory due to the sequential memory access pattern of accessing from the buffer's header 122 first followed by the data portion 123. Since the number and size of buffers is fixed in a memory region 112a-n, such alignment of buffers in memory region 112a-n (with buffers not sharing cache lines) leads to alignment of messages to CPU cache lines for efficient memory access.

Optionally, since predetermining the number and size of buffers in a buffer ring 120 enables each message to be aligned as desired in memory, it can also be used to align message data as required to enable CPU vector operations (e.g., SIMD—Single Instruction Multiple Dispatch, etc.). Such instructions enable highly efficient parallel computations but impose precise memory address alignment constraints on the data, as required in robotic system operations such as autonomous vehicles.

In certain embodiments, a buffer ring 120 may also include a global header 124. When embodied in systems that support it (such as LINUX), the global header 124 may include a sequential lock (seqlock) that is associated with a storage for saving a counter in addition to the seqlock. Other types of locking mechanisms are within the scope of this disclosure. The seqlock is to support synchronization between two publishers (atomic operation) and the counter is for indicating current write position of a publisher in the buffer ring 120 (also referred to as the "HEAD" of the buffer ring). The seqlock is acquired by a publisher before writing data to the buffer ring 120, and released when the write operation is completed. The counter is stored as a signed integer and is initialized to have a value of −2 when the buffer ring 120 is empty. When a publisher acquires the seqlock for a first write operation to the buffer ring 120 (i.e., the value of the counter is −2), it atomically increments the value to −1. Upon completion of this first write operation, the publisher sets the value of the counter to 0 before releasing the seqlock. A publisher during any subsequent write operation increments the counter by one when the seqlock is acquired. When releasing the seqlock, the publisher increments the counter by the value of the counter (before acquiring the lock) by 2 modulo the number of buffers in the buffer ring. For example, if a buffer ring includes 10 buffers the value of the counter will be 0, 2, 4 6, 8, 10, 12, 14, 16, 18, and back to 0 and so on. This increment-and-modulo is done atomically to allow for mutual exclusion with respect to accessing the counter for the duration of an indivisible operation. Such a configuration of the global header 124 allows for the counter of the seqlock to be used for determining the current write position of a publisher in the buffer ring 120. Specifically, any time a value of the counter in the seqlock is negative (−2 or −1) the buffer ring 120 is empty with no previous write operations (−2) or a first write operation is in progress (−1). However, if a value of the counter is zero or positive, the value of the counter divided by two is equal to the index of the buffer that was most recently written to and consequently the current write position in the buffer ring 120. Such a calculation is efficient in both CPU time and memory utilization.

Typically, a single publisher may write data to buffer ring 120, and may sequentially write data to the buffers of the buffer ring 120. However, the seqlock and the associated counter of the global header 124 can be used such that multiple publishers can write to the buffer ring 120. Each publisher in a multi-publisher scenario may use the counter to determine the index of the buffer that it should write to next without overwriting a message written by a previous publisher and that has not been read by one or more subscribers.

Subscribers may use the current write position in the buffer ring 120 determined using the counter of the global header in combination with their own local read position (that each subscriber maintains) to determine when they have read all available messages and should wait for a notification of new message. For example, if the buffer counter (described below) of a subscriber's current read position is the same as the current write position in the buffer ring 120, the subscriber may determine that is has read all the messages in the buffer ring.

Referring back to FIG. 1, the shared memory 110 also includes a synchronization data region 130a-n corresponding to each buffer in a memory region present at a memory address that is determinable based on synchronization information included in the buffer header 122. Each synchronization data region 130 is configured to store a buffer counter that is accessible using suitable atomic instructions by processes (publishers and/or subscribes) performing a read or write operation to the corresponding buffer. Use of atomic instructions allows multiple threads or processes to access the buffer without additional locking of buffer or synchronization of processes. The buffer counter for each buffer is initialized with a "0" value.

When a publisher performs a write operation to a buffer, it increments the value of the buffer counter by 1 at the beginning of the write operation using an atomic compare-and-exchange instruction at the synchronization data region 130. After completion of the write operation, the publisher increments the value of the buffer counter again by 1. The value of the buffer counter, therefore, increments by two with each write, and is odd during a write operation to a buffer and even when no write operation is in progress (or vice versa—i.e., when the buffer counter is initialized with 1, the value of the buffer counter is even during a write operation to a buffer and odd when no write operation is in progress).

During a read operation to the buffer, a subscriber begins a read by reading (and storing a local copy of) the value of the buffer counter at the corresponding data synchronization region. If the value of the buffer counter is odd, the subscriber determines that a write operation is in progress and waits for notification that the write operation is completed (notification mechanism described below) before reading data from the buffer. If the value of the buffer counter is even, the subscriber proceeds to read the data stored in the buffer. After the read operation is complete, the subscriber reads the value of the buffer counter at the corresponding data synchronization region a second time, and compares the value to the locally stored value of the buffer counter obtained at the start of the read operation. If the buffer counter value is unchanged, then the subscriber determines that the data in the buffer is not corrupted (i.e., no concurrent write operation occurred while the subscriber was performing the read operation). However, if the buffer counter value changes between the beginning and the end of the read operation, then subscriber determines that there was a concurrent write operation, and the read operation may have inconsistent data or the read was corrupted. If the read is determined to be corrupted, the subscriber may perform at least one of the following: discard the read operation and any data derived from it; log an error, skip to a new buffer position, or a combination thereof. The new buffer position may be a buffer that is located a predefined number of buffers ahead of the current subscriber position in the buffer ring irrespective of the current write position of the publisher. Alternatively and/or additionally, the subscriber may determine the index of the buffer that will be written next in the buffer ring using the seqlock included in the global header of the buffer, and skip to that buffer and/or a buffer proceeding that buffer (e.g., buffer immediately before the current write position, a buffer two positions behind the current write position, or the like). A subscriber may also check how far behind a publisher it is and preemptively skip forward to a new buffer position that is closer to the publisher to reduce risk of corrupted reads.

A subscriber can also determine its lag behind a publisher in a buffer ring based on the increment-by-two-per-write property of the buffer counter in combination with the write pattern of proceeding through the buffer ring sequentially as a function of a change in the value of the buffer counter between a previous read operation and a current read operation performed by the subscriber. In some embodiments, a change in the value of the buffer counter greater than a threshold may be indicative that the subscriber will be "lapped" by the publisher (the term lapped, as used herein, refers to a publisher overwriting data in a buffer of a buffer ring before a subscriber reading the overwritten data because the subscriber lags behind the publisher), and must take action to catch up. For example, the subscriber may skip reading data from a predefined number of buffers in the buffer ring irrespective of the current write position of the publisher. Alternatively and/or additionally, the subscriber may determine the index of the buffer that will be written next in the buffer ring using the counter/seqlock included in the global header of the buffer, and skip to that buffer and/or a buffer proceeding that buffer (e.g., buffer immediately before the current write position, a buffer two positions behind the current write position, or the like).

As discussed above, the fixed number of buffers in the buffer ring, each having a fixed size, means that each subscriber maintains its own current read position in the buffer ring, independent of other subscribers and independent of the publisher. In other words, using distinct fixed-size buffers allows each buffer to be independently synchronized, with synchronization data for each buffer present at predictable, easily computed memory addresses. This allows the publisher to write to one buffer while subscribers read from other buffers without any interference. Moreover, a subscriber which has fallen behind a publisher and/or other subscribers and requires the most recent message rather than historical messages may access the buffer including the most recent message without having to process all of the intervening data (between the message it last read and the most recent message). Such a configuration favors low latency over reliability that is required in robotic systems such as autonomous vehicles.

As discussed above, multiple publishers may write to a buffer ring. The atomic compare-and-exchange used to increment the buffer counter ensures that only a single publisher can successfully transition the counter from even to odd and, therefore, proceed to write to the buffer. A concurrent publisher will fail this operation and will be blocked from writing to the same buffer, and must wait for a notification that the write operation is complete before proceeding with a write operation itself.

The memory configuration of the current disclosure also eliminates backpressure from subscribers to the publisher of a buffer ring. The publisher simply proceeds consecutively and sequentially in the buffer ring to perform write operations independently of the number of subscribers and/or read positions of subscribers of the buffer ring because each subscriber is responsible for maintaining its own read position in the buffer ring and for independently detecting when it has fallen behind.

Notifications

In the above described publish/subscribe data communication system, a subscriber may register interest in or subscribe to events pertaining to a given topic, via a memory broker described below; thereafter, the subscriber receives notifications of such events, which are produced by publishers.

In such a publish/subscribe system, publishers of data do not communicate directly with subscribers; instead, publishers and subscribers interact through an intermediate entity referred to here as a memory broker 170, but also known in the art by various other names, such as notification server or event service. Publishers may publish notifications about the occurrence of the events on a channel by first marking these notifications with a particular topic. Subscribers receive notifications in the form of the messages from the memory broker 170 for events that conform to the topic(s) in which they have registered interest. Since message producers (publishers) and consumers (subscribers) communicate indirectly with each other via a memory broker 170, message transmission is decoupled from message reception. As a consequence, neither producers nor consumers need to maintain state about each other, and dependencies between the interacting participants are reduced or eliminated. The publish/subscribe scheme is therefore more flexible than other communication paradigms, such as point-to-point messaging, because publishers and subscribers can be started and stopped asynchronously. Furthermore, the event notification are sent to the subscribers or publishers rather than them querying for updates. This results in a reduction of network traffic.

Such a system is well suited to robotic systems (e.g., autonomous vehicles) in which many sensors monitor the dynamically changing state of some underlying system and forward measurement data to a central server site. For example, in an autonomous vehicle, vehicle sensors may produce notifications about changes in state of the underlying system and may be modeled as publishers of particular types of events (change in state in the vehicle system) or topics, and vehicle systems such as perception system, prediction system, route planning system, etc. that monitor the events are modeled may be modeled as subscribers.

In embodiments of the current disclosure, the counter included the global header 124 of a buffer ring and/or a buffer counter stored in the corresponding synchronization data region 130 may be used in novel notification mechanisms, as described below.

In certain embodiments, a notification mechanism may rely on futex (fast user-space mutex) mechanisms provided by certain OS such as those employing a Linux kernel. In this implementation, a thread that waits on a condition variable (via, for example, a pthread_cond_wait) makes a futex system call with a FUTEX_WAIT argument, which causes the thread to be suspended and de-scheduled. When the worker notifies the blocked thread (via, for example, a pthread_cond_signal), a futex system call with a FUTEX_WAKE argument is made, which causes the waiting thread to be awakened and rescheduled. Such futex mechanisms require that there be a memory address accessible by all involved processes or threads, and that the data stored at that memory address be modified whenever one process wishes to notify/wake the processes or threads that are currently waiting on the futex.

Given that the synchronization data region 130 for each buffer in a buffer ring is located in shared memory 110 making it accessible to both publishers and subscribers, and the value of the buffer counter stored therein is incremented every time a write operation to the corresponding occurs, a futex (a 32-bit integer stored at a memory location, and futex system calls operate from that location) may be stored in the synchronization data region 130. Such a futex system call may include a wait queue of processes or threads that is attached to the buffer counter in the same synchronization data region 130 to request operations on the wait queue. The wait queue of processes may include subscribers waiting for a notification of a new write operation to a buffer, or publishers waiting for completion of a write operation to a buffer (e.g., when multiple publishers may write to a buffer ring). For example, the futex system call may be used to send a notification to subscribers of a buffer ring when a value of a buffer counter corresponding to a buffer in the buffer ring is even and incremented by 2, to prompt the subscribers to read the newly written messages from the corresponding buffer. Similarly, the futex system call may be used to put subscribers on a wait queue if the value of the buffer counter is either odd or not incremented since the last write operation. Since the synchronization data region 130 is unique to each buffer of a buffer ring, such a futex system call notification may also be indicative of the identity of the buffer on which the write operation is performed. As mentioned above, a concurrent publisher will be blocked from writing to the a buffer when a write operation to that buffer is already in progress by another publisher, and must wait for a notification that the write operation is complete before proceeding with a write operation itself. In such scenarios, the futex system call may be used to send a notification to publishers of a buffer ring when a value of a buffer counter corresponding to a buffer is changed from odd to even (or vice versa).

In some embodiments, the above described futex system call may be stored in the global header 124 and attached to the counter stored therein. Such a futex system call may include a wait queue of processes or threads that is attached to the counter in the global header 124 to request operations on the wait queue. For example, the futex system call may be used to send a notification to subscribers of a buffer ring when a value of the counter is incremented by 2, to prompt the subscribers to read the newly written messages from the buffer ring. Similarly, the futex system call may be used to put subscribers on a wait queue if the value of the counter has not incremented since the last write operation to the buffer ring. As discussed above, a number may be used to identify the current write position of a publisher in the buffer ring and subscribers may read data written to preceding buffers with respect to the write position.

While the above description describes the use of futex in combination with the buffer counter and/or the seqlock counter (i.e., futex is shared by subscribers), optionally, a futex may be separately created for each subscriber. In such scenarios, a futex memory location may be assigned to each subscriber which may store a bitmap including 1 bit associated with each channel (or buffer ring) for which the subscriber wishes to receive notifications. When a subscriber is ready to wait on a channel or buffer ring, it may change the bit value for that channel or buffer ring to 1 (or 0) in the bitmap, and then wait on the futex system call. Upon completion of a write operation to a channel, the publisher may atomically change the bit for that channel to 0 (or 1) with a bitwise atomic AND operation. If the atomic operation indicated that the bit changed state from 1 to 0 or 0 to 1 (i.e., a subscriber is waiting on the channel), a notification may be sent using the futex system call to the waiting subscriber. This allows the subscriber to wait on multiple channels and efficiently know which channel(s) were responsible for it being woken.

Notification mechanisms that do not use futex system calls are also within the scope of this disclosure. Examples may include, without limitation, file-like mechanisms provided by the OS (e.g., eventfd object, a first-in-first-out pipe, a network socket connection) with one such file-like entity per publisher/subscriber pair, UNIX socket (i.e., non-network or local), or the like.

In an eventfd based notification mechanism, objects known as eventfd objects may be associated with file descriptors created by the OS at the request of a process. Such file descriptors may then be shared with other processes. Subscriber processes can wait efficiently for a file descriptor to be readable, using various mechanisms such as, without limitation, select( ), poll( ), epoll( ), etc. A publisher process may write to the eventfd object file descriptor after performing a write operation to shared memory, which efficiently wakes the subscribing processes. Such a notification mechanism requires at least one eventfd object per buffer ring and may be created when the buffer ring is created. The eventfd object may be shared via one of the OS supported means for doing so such as, without limitation, inheriting from parent to child process, sharing via local network sockets, or the like. This mechanism allows subscribers to efficiently wait on any one of several channels or buffer rings to have new data as the OS supplies mechanisms for waiting for notification on multiple file descriptors.

Optionally, the eventfd object may be used in a "semaphore mode" that maintains an internal counter. A publisher may increment this counter by some defined value, and as each waiting subscriber is woken the counter may be decremented by 1. This allows the publisher to control how many subscribers may be woken using the eventfd notification. A separate counter ("subscriber counter") may also be used for the number of subscribers waiting on a channel or buffer ring. When a subscriber wants to wait on a channel, it first increments the subscriber counter and then checks whether it still needs to wait (by comparing to the previous counter value). If the subscriber still needs to wait, it waits on the eventfd object. However, if the subscriber does not need to wait, it immediately decrements the subscriber counter and does not wait on the eventfd object. When the publisher is ready to notify subscribers of a new write operation, it reads the count of waiting subscriber via an atomic exchange instruction on the subscriber counter, which returns the subscriber counter value to the publisher and resets the subscriber counter to zero. The publisher then writes this value to the eventfd object, resulting in the correct number of subscribers being notified/woken.

In certain embodiments, use of eventfd notification may require an eventfd broker (at each node) to execute the notification mechanism. For example, the eventfd broker may create a domain socket and listen for connection requests. A peer may open a connection to the broker and keep that connection open as long as it is executing a task. Publishing peers may also create or allocate their memory region in shared memory and corresponding eventfd object, and communicate the region name and eventfd object to the eventfd broker. The eventfd broker may transmit the region names and eventfd objects for channels that are requested by a subscribing peer, including updates as publishers come and go (or restart). In some embodiments, the evenfd broker may be the memory broker described below.

Memory Broker

Referring back to FIG. 1, the shared memory 110 may also be in communication with a memory broker 170 configured to manage the memory regions 112*a-n* and buffer rings 120*a-n*. A broker 170 may include a single process configured to perform all the tasks or multiple processes assigned to perform one or more of the memory broker's tasks. The memory broker 170 may dynamically set up an inter process communication mechanism (e.g., a UNIX domain socket, an internet socket, local sockets, a network socket, a first-in-first-out pipe, or the like), according to various OS requirements for communication with subscribers, publishers, and/or shared memory 110. It should be noted that the memory broker 170 only communicates metadata, and is only involved during startup, state reconstruction, task restart, and/or shutdown. The messages published in shared memory 110 never flow through the memory broker 170.

A memory broker 170 may be initialized by creating an inter process communication (IPC) mechanism using any now or hereafter known methods. If the IPC mechanism is a domain socket, the initialization may include binding the socket to a globally configured broker address to create a unique file path for a given network node. If a memory broker cannot create the unique file path using the globally configured broker address, it may be an indication that another memory broker already exists/running for the network node. Upon initialization, the memory broker may identify all the existing named memory regions in the shared memory 110 by, for example, accessing the temporary file storage that includes named file regions discussed (e.g., dev/shm in Linux OS). The memory broker may then use the expected naming pattern for buffer rings to identify buffer ring IDs for each named memory region. The memory broker may also map each named memory region (e.g., using mmap( ) and attempt to attach to the buffer ring of that memory region. If the attachment is not successful, the memory broker may determine that such a buffer ring is corrupted and delete the corresponding entry in the temporary database 172 (e.g., /dev/shm entry). If a process is using such a corrupted buffer ring, deleting the corresponding entry will not deallocate the region until all references to the buffer ring have been removed.

It should be noted that if a notification mechanism based on sharing file descriptors (e.g., eventfd object described above) is chosen, then UNIX domain sockets must be used as the IPC mechanism between memory brokers and their peers because that is the only IPC mechanism which allows file descriptors to be shared between processes.

If the attachment is successful, the memory broker 170 may create a record of the buffer ring in a data store 175*a-n*, and periodically update information or metadata relating to the buffer ring such as without limitation, ring ID, buffer size, buffer alignment, ring size (i.e., the number of buffer), associated channel if the associated channel is known, list of publishers known to be publishing to the ring, or the like. In some embodiments, if the attachment is successful, the memory broker 170 may put the buffer ring in probation and create a corresponding record in a probation list (discussed below).

In certain embodiments, upon initialization, the memory broker 170 may perform various functions for management of the shared memory 110 such as, without limitation, accept connections from processes (subscribers and/or publishers) on its inter process communication socket; validate or authenticate the connections; exchange protocol messages with the processes; allocate, initialize, and/or deallocate new memory regions/buffer rings/channels/etc.; review and update metadata or information relating to existing buffer rings/channels/peers (periodically and/or upon occurrence of a trigger event); perform state reconstruction; perform diagnostics and repair of shared memory; communicate information about buffer rings to publishers, subscribers, and diagnostic/testing tools; or the like.

In one or more embodiments, the memory broker 170 may allocate, initialize, and/or deallocate the various memory regions 112*a-n* and/or buffer rings 120*a-n*, for example, in response to a request from a publisher of a topic by sending an instruction to the OS. As discussed above, a memory region may only include one buffer ring.

Figure 4:
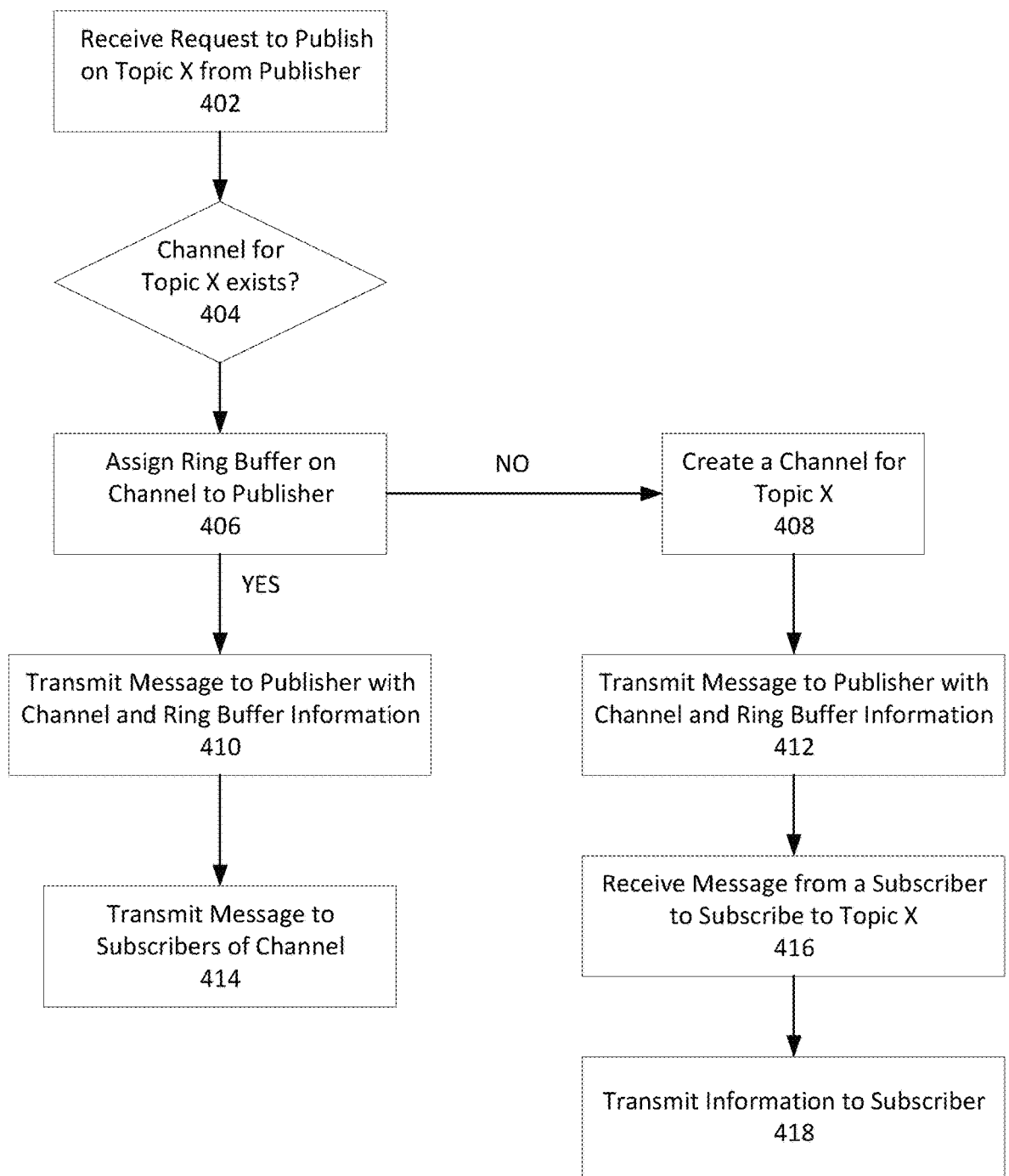
FIG. 4 is a flowchart illustrating an example method for allocating a buffer ring by a memory broker.

FIG. 4 is a flowchart illustrating an example method for allocating a buffer ring by a memory broker. At 402, the memory broker may receive a request from a publisher to publish messages relating to a topic "X." The request may include identification and authentication information corresponding to the publisher. Such identification information may include for example publisher ID such as a security identifier, a device identifier, or the like. The identification information may also include information such as, without limitation, task globally unique identifier (GUID), task instance name. For example, the memory broker may determine the publisher identification (pose filter), task name (pose data), and task GUID. Task used in this specification represents a unit of work for executing parallel processing of a process and a thread on a UNIX OS, a task on a real time OS and the like. Each task can publish to one or more topics. The memory broker may determine the topic X based on the identification information. Optionally, the topic "X" may be explicitly included in the request. The request may also include parameters of messages to be published by the publisher such as, without limitation, metadata about the message, deadlines, buffers sizes, default values, QoS reliability criteria, types of configuration data, or the like. Authentication information may include information used by any now or hereafter known authentication protocols such as without limitation, usernames, passwords, security certificates, authentication tokens, or the like.

It should be noted that the memory broker may include and/or access a data store 175a-n including a database of peer IDs, task GUIDs, task instance names for performing identification and authentication. Each peer ID may also be associated with a list of subscriber channels, list of buffer rings the peer is publishing to, a connection status (e.g., connected or disconnected, socket descriptor, etc.) or the like. The database may be periodically updated by the broker 170.

In certain embodiments, the publisher may initiate a connection with the memory broker (e.g., in a HELLO packet) before sending a PUBLISH_MESSAGE request to the memory broker. One or more of the identification and/or authentication information may be included in the HELLO packet. Parameters for publishing the message and identification of the topic may be included in the HELLO packet and/or the PUBLISH_MESSAGE request.

At 404, the memory broker may determine if a channel corresponding to topic X already exists in the communication network. If such a channel exists (404: YES), the memory broker may assign a ring buffer on the channel to the publisher (step 406) by creating a new buffer ring on the channel for the publisher or assigning an already existing buffer ring on the channel to the publisher. The memory broker may create a new buffer ring on the channel in at least the following situations: (i) the system does not allow multiple publishers to publish messages to a single buffer ring and all the suitably configured buffer rings on the channel are already associated with a live publisher; (ii) the system allows multiple publishers to publish messages to a single buffer ring but the buffer rings on the channel are not suitably configured for the publisher's messages (e.g., unsuitable buffer ring size, number of buffers, message size, difference in tasks with respect to the other publishers of that buffer ring, or the like); (iii) the already existing buffer rings are not suitably configured for the publisher's messages (e.g., unsuitable buffer ring size, number of buffers, message size, or the like); (iv) buffer rings of the channel in a fault state; (v) the publisher is not allowed to publish to the already existing buffer rings, etc. The memory broker may use the parameters included in the publisher's request to create the buffer ring in view of various channel constraints. Examples of such channel constraints may include, without limitation, maximum message size, maximum number of buffers, message type, channel priority (in terms of allowed latency) or the like.

The memory broker may assign an already existing buffer ring on the channel to the publisher in at least the following situations: (i) the system allows multiple publishers to publish messages to a single buffer ring and there are one or more buffer rings on the channel suitably configured for the publisher's messages; (ii) the system does not allow multiple publishers to publish messages to a single buffer ring and there is at least one suitably configured buffer ring on the channel that is not already associated with a live publisher; etc.

In some embodiments, if a channel already exists, the memory broker may assign a buffer ring from a probation list on the channel (discussed below in more detail).

If a channel corresponding to topic X does not already exist (404: NO), the memory broker may create 408 a new channel and at least one buffer ring for the publisher. Various channel parameters for creating the channel and the buffer ring parameters may be provided by the publisher, the memory broker, and/or a subscriber. Examples of channel parameters may include, without limitation, maximum size of each message on the channel (which is used to determine the size of each buffer in the buffer rings of the channel), the maximum number of messages to queue (which is used to determine the number of buffers in the buffer rings of the channel), number of publishers allowed to publish on a buffer ring of the channel, maximum number of buffer rings on the channel, buffer ring sharing allowed or not, channel priority in terms of allowed latency, types of messages, channel naming protocol, allowed list of publishers allowed to publish to the channel, or the like. In certain embodiments, the memory broker may use a stable integer ID as channel identification independent of the channel string name. Such a naming protocol may simplify backend log processing, make header compact and fixed size, reduce risk of collisions between name, or the like. For example, a 64-bit hash of the channel name may be used as the stable integer ID.

In some embodiments, a channel may be associated with an approved list of publishers that can publish messages to buffer rings of the channel. In such embodiments, even if a channel corresponding to topic X exists, it may not allow the publisher transmitting the request to publish messages to its buffer rings. In such scenarios, the memory broker may create a new channel with a new buffer ring, as discussed above with respect step 408.

At 410 and 412, the memory broker may transmit a message (e.g., PUBLISH_OK) to the publisher that includes information relating to the channel and/or the buffer ring to which the publisher can publish to.

At 414, if a new buffer ring is assigned to the publisher in an already existing channel, the memory broker may transmit a message (e.g., a SUBSCRIBE_TO) to all subscribers of the channel or the topic "X", and include information relating to the channel and/or the new buffer ring.

If a new channel is created, the memory broker may receive a message (416) from a subscriber wishing to subscribe to the channel and/or topic "X" (e.g., a SUBSCRIBE message). Optionally, the memory broker may receive a message from a subscriber to request subscription to a publisher, and all buffer rings/channels associated with the publisher. In response to receiving the message, the memory broker may transmit a message (e.g., a SUBSCRIBE_TO) the subscriber requesting to subscribe to the channel, the topic "X", and/or the publisher, and include information relating to the channel and each buffer ring on the new channel. The memory broker may remember the subscription and send additional messages to the subscriber whenever new buffer rings are created on the channel.

Peers may terminate a channel relationship and/or relationship with a buffer ring of a channel by sending a message to terminate relationship to the memory broker, including the channel ID and/or the buffer ring ID (e.g., STOP_PUBLISH or STOP_SUBSCRIBE as appropriate). Alternatively and/or additionally, terminate all open relationships within a memory system by sending a message to the memory broker (e.g., a GOODBYE message) followed by disconnect. For example, a CLOSE_RING message may be sent to all publishers and subscribers of a buffer ring when the ring is shut down by the broker in a clean way.

In some embodiments, publisher may stop publishing to a buffer ring and send a notification to the memory broker regarding the same (e.g., a GOODBYE or a STOP_PUB-LISH message). The memory broker may then notify subscribers of the buffer ring that the publisher is no longer publishing data to the buffer ring (e.g., a STOP_SUB-SCRIBE message). Such a notification may, optionally, include information relating to the last write position (e.g., the seqlock counter) such that the subscriber may continue reading messages from the buffer ring until it has read the last published message. Alternatively, a subscriber may stop reading messages from a buffer ring once it becomes aware that a publisher has stopped publishing messages even if there are unread messages in the buffer ring. A subscriber may also autonomously decide to stop reading messages from a buffer ring and send an appropriate message to the memory broker.

In one or more embodiments, upon creation of a channel, the memory broker may create a record of the channel in a data store 175a-n, and periodically (and/or when any changes are made to the channel) update information relating to the channel such as without limitation, channel name and/or ID, a list of peers known to be subscribed to channel, a list of peers known to be publishing to channel, a list of buffer rings known to be associated with this channel, or the like.

Similarly, upon creation of a buffer ring, the memory broker may create a record of the buffer ring in a data store 175a-n, and periodically (and/or when a peer reports that the buffer ring is not functioning properly) update information relating to the buffer ring such as without limitation, ring ID, buffer size, buffer alignment, ring size (i.e., the number of buffer), associated channel if the associated channel is known, list of publishers known to be publishing to the ring, or the like.

The memory broker may also periodically analyze a state of existing buffer rings in the system to determine whether one or more of the buffer rings should be temporarily removed from usage (i.e., put on probation while broker determines whether there are errors, and the system keeps functioning as before), revived from probation, and/or permanently removed from usage (i.e., abandoned). Optionally, the memory broker may analyze a state of a buffer ring in the system to determine whether that buffer ring should be put on probation, revived from probation, and/or permanently abandoned upon occurrence of a triggering event. Examples of such triggering events may include, without limitation, unexpected loss of connection (e.g., network connection) between a publisher and a memory broker, receipt of a message from a peer of the buffer ring indicating an issue with respect to the buffer ring (e.g., a publisher timed out waiting for a write lock release, a subscriber timed out waiting for new messages, or any peer detected potential corruption in the buffer ring), occurrence of a faulty read operation and/or a faulty write operation to the buffer ring, memory broker reconstruction (described below), when metadata or header of the buffer ring includes an error or is invalid (e.g., number of buffers, seqlock value, size etc.), or the like. When there is an unexpected loss of connection between a publisher and the memory broker (e.g., loss of connection without a GOODBYE message from the publisher), the memory may then analyze the state of all buffer rings associated with such a publisher.

Upon occurrence of a triggering event, the memory broker may analyze the state of more than one buffer ring (e.g., unexpected loss of connection between a publisher and the memory broker) or a particular buffer ring (e.g., message from a peer about a buffer ring) to determine if the buffer ring is corrupted. A buffer ring is corrupted when metadata or header of the buffer ring includes an error or is invalid (e.g., number of buffers, seqlock value, size etc.) and/or when a publisher flags an error state of a buffer ring. If a buffer ring is found to be corrupted, the memory broker may bypass probation and abandon the buffer ring as described below. If the buffer ring(s) is not corrupted, the memory broker may capture the buffer ring state and place it on probation. In some embodiment, if a connection is reestablished with the publisher, before any abandonment conditions occur (described below), the memory broker may remove the buffer ring from probation and instruct the publisher to resume publishing on the buffer ring.

A buffer ring may be put on probation if, for example, there is no live and active publisher publishing data to the buffer ring. This may happen when, for example, a publisher stops publishing messages to the buffer ring; a publisher hangs, crashes, restarts, or otherwise become deactivated; or the like. The memory broker may determine that there is no live and active publisher publishing data to the buffer ring by analyzing at least one of the following: the value of the seqlock counter, the value of the buffer counter, or the write lock state. For example, if the value of the buffer counter does not change (i.e., not incrementing) and/or the seqlock counter does not change (i.e., static value) for a certain time period, the memory broker may determine that a publisher is not publishing data to the buffer ring. Similarly, if the write lock is not acquired by a publisher for a certain time period, the memory broker may determine that a publisher is not publishing data to the buffer ring. If the write lock acquired by a publisher before a write operation is not released for a certain time period, the memory broker may determine that the publisher has crashed, hung, restarted, or has otherwise been deactivated.

Finally, a buffer ring may be put on probation during state reconstruction of a memory broker after memory broker restart (described below). Such buffer rings remain on probation until the memory broker has collected enough state information to determine that there is at least one live publisher associated with a buffer ring.

Upon determining that a buffer ring should be put on probation, the memory broker 170 may not remove the buffer ring from usage and read/write operations may continue while the broker analyzes the buffer ring state. Once a buffer ring is put on probation, it remains in probation until either it is known to have a live, active publisher and there are no write locks being held too long by any publisher; or until it is abandoned, determined based on analysis of the state of the buffer ring on probation.

The memory broker 170 may also create a record of the buffer ring put on probation in a data store 175a-n (i.e., add to a probation list), the record including at least a following information: buffer ring ID, current write position or HEAD in the buffer ring, whether there is a write lock on the buffer ring (i.e., seqlock not released), timestamp of most recent write operation, timestamp of when the ring is put on probation, and timestamp of most recent update of the record. In some embodiments, the memory broker 170 may analyze the state of each buffer ring on the probation list periodically at a configurable frequency (e.g., about 1 Hz, about 2 Hz, about 3 Hz, or the like). Alternatively and/or additionally, the memory broker 170 may analyze the state of one or more buffer rings on the probation list upon occurrence of a triggering event.

The memory broker 170 may analyze the state of a buffer ring by checking for state updates in the buffer ring itself—for example, by comparing the current state with the corresponding values/information of the record included in the probation list. The memory broker 170 may update the record of the buffer ring in the probation list to include the current state information or value and the corresponding time stamps. For example, state information corresponding the status of the write lock being acquired/released, change in the HEAD or current write position of the buffer ring, or the like.

The memory broker 170 may remove a buffer list from probation if the state of a buffer ring on probation changes to include any of the following: at least one known publisher, change sin HEAD position, and/or release of any write locks seen during the last check. Upon removal of a buffer ring from probation, the memory broker 170 may send a notification (e.g., SUBSCRIBE_TO messages) to subscribers of that buffer ring, topic, or channel.

However, if the state of a buffer ring does change such that it cannot be removed from probation, the memory broker 170 may check the timestamps (e.g., total time on probation, total time of write lock being held, time since change in HEAD position, and/or time since last published message, etc.) in the record of the buffer ring to determine if the buffer ring should be abandoned. For example, the memory broker may 170 check the timestamps to determine the total time the buffer ring has been on probation and if it is greater than a threshold time (e.g., about 8-12 seconds, about 5-15 seconds, about 2-18 seconds, about 9 seconds, about 10 seconds, about 11 seconds, or the like), the memory broker 170 may abandon the buffer ring. Similarly, memory broker may 170 check the timestamps to determine the total time associated with a write lock of the buffer ring being held or acquired, and if it is greater than a threshold time (e.g., about 0.1-0.2 seconds, about 0.2-0.5 seconds, or the like), the memory broker 170 may abandon the buffer ring. Additionally and/or alternatively, if the HEAD or write position of the buffer ring does not change for a threshold period of time associated with the channel of the buffer ring (e.g., about 2-8 seconds, about 3-7 seconds, about 4-6 seconds, about 5 seconds, about 4 seconds, about 7 seconds, or the like), the memory broker 170 may abandon the buffer ring. In yet another embodiment, if the timestamp associated with the most recent message published to the buffer ring is older than a threshold period of time associated with the channel of the buffer ring (e.g., about 2-8 seconds, about 3-7 seconds, about 4-6 seconds, about 5 seconds, about 4 seconds, about 7 seconds, or the like), the memory broker 170 may abandon the buffer ring.

If the memory broker 170 determines that the buffer ring should be abandoned, it may execute an abandonment procedure. The abandonment procedure may include performing one or more of the following: log an error and perform diagnostics on the buffer ring; mark the buffer ring as being invalid/abandoned in the shared memory 110 (e.g., in a header space of the shared memory 110); send a notification to the peers of the buffer ring (subscribers subscribing to buffer ring and publishers publishing to buffer ring) that it has been abandoned; delete the corresponding memory region from the shared memory; delete record associated with the buffer ring in temporary data store 172; and discard all metadata and information stored in association with the buffer ring. Once a buffer ring is abandoned, the system or memory broker 170 may still read messages for logging purposes only (even if the messages are corrupted).

In some embodiments, the memory broker 170 may instruct subscribers that they can continue to consume pending messages from the buffer ring being abandoned but then should release the ring once they read all pending messages (e.g., a CLOSE_RING message). Alternatively, the memory broker 170 may instruct subscribers to immediately release the buffer ring, leaving pending messages unconsumed (e.g., ABANDON_RING message). It should be noted that publishers may never publish new messages to a buffer ring being abandoned.

The memory broker may periodically and/or upon occurrence of a triggering event analyze and update information relating to the peers. Such information may include, for example, an indication of whether a peer is connected to the memory broker 170, channels subscribed to or publishing to, topics, latency, or the like.

As discussed above, the memory broker 170 has access to metadata and/or information about the state of all shared buffer rings, memory regions, and channels associated with the shared memory 120 from system startup to shut down. Therefore, if a publisher or subscriber become unavailable (e.g., intentionally, through a failure, crash or loss of connection), the memory broker 170 may provide any lost information about the shared buffer rings, memory regions, and/or channels associated with the shared memory 120 to the publisher or subscriber upon restart from a failure/crash and/or upon reconnection with the memory broker 170 (so long as the memory broker remains alive).

The memory broker 170 may also be configured to recover from failures or crashes of the memory broker itself using the state reconstruction methods described below. Such state reconstruction does not interrupt any existing and established publisher/subscriber relationship such that publishers continue publishing messages on existing buffer rings, and subscribers continue receiving those messages.

Figure 5:
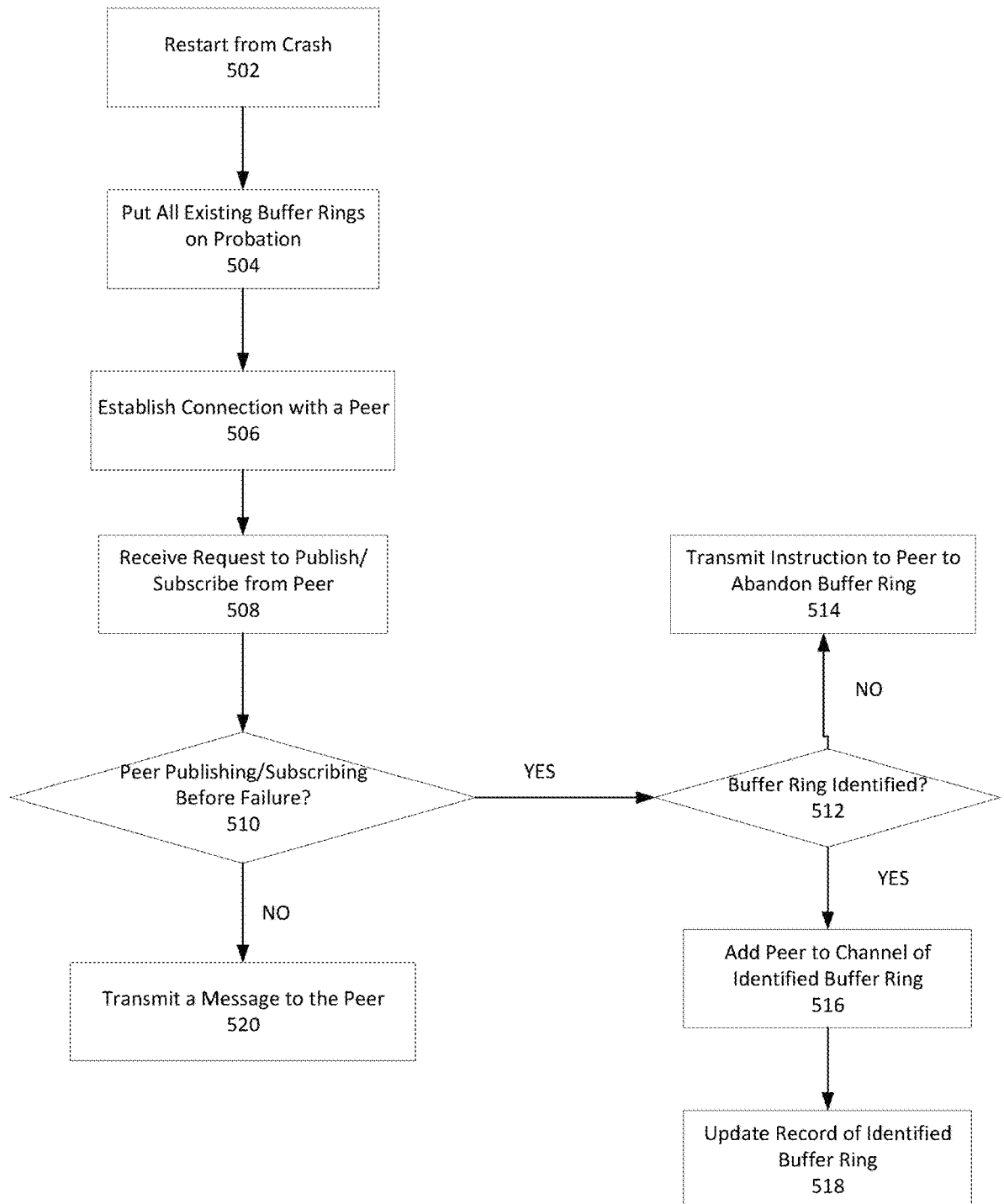
FIG. 5 is a flowchart illustrating an example method for state reconstruction of a memory broker upon restart.

FIG. 5 is a flowchart illustrating an example method for state reconstruction of a memory broker upon restart from a failure or crash. It should be noted that during state reconstruction, any existing and active publisher/subscriber relationships which were established prior to the memory broker restart may continue to work normally. The memory broker may not interrupt these relationships unless it determines that there is an associated issue or error (discussed below).

At 502, a memory broker may restart from a crash or a failure. For example, the memory broker may create a new UNIX socket. The memory broker may determine whether the restart is from a crash or a failure by checking for left over memory regions in the shared temporary storage 172 (e.g., /dev/shm/) because such left over memory regions are only exist upon restart from a failure (and not after a clean shut down event). Upon detection of such left over memory regions, the memory broker may then put all existing and active buffer rings in the shared memory on probation (504), until the ring is either abandoned or associated with a live and active publisher.

Upon restart, the memory broker may establish a connection (506) with a peer upon receipt of a connection request (e.g., in a HELLO packet). The peer may establish the connection by transmitting a connection request that includes identification information and/or authentication information to the memory broker. As discussed above, the identification information may include, for example, a peer ID, task GUID, task instance name, or the like. The memory broker may verify the identification and/or authentication information by consulting a data store configured to store peer information, and establish the connection upon verification. The memory broker may also update metadata associated with the peer in the data store 175a-n. When the broker receives a connection request from a peer, it may check the peer ID for duplicates/collisions and may deny the connection request if a connection already exists with the requesting peer.

Once a connection is established with a peer, the memory broker may receive a request to publish and/or subscribe from the peer (508). The memory broker may determine whether the peer was already publishing or subscribing to a buffer ring associated with the memory broker before the memory broker restart (510). If the peer was already publishing or subscribing to a buffer ring associated with the memory broker before the memory broker restart, the peer has information or metadata about the buffer ring (previously provided by memory broker to the peer, as discussed above). Examples of such information may include, without limitation, buffer ring ID/name, memory region name, channel ID/name, channel parameters, a subscriber IDs (for a publisher), publisher IDs (for a subscriber), or the like.

Hence, if the request to publish and/or subscribe includes information or metadata about the corresponding buffer ring(s), the memory broker may determine that the peer was already publishing or subscribing to a buffer ring associated with the memory broker before the memory broker restart (510: YES). However, if the request to publish and/or subscribe does not include information about a buffer ring, the memory broker may determine that the peer was not publishing or subscribing to a buffer ring associated with the memory broker before the memory broker restart (510: NO), and may create a new buffer ring for the peer (as discussed above with respect to FIG. 4).

If the memory broker determines that the peer was already publishing or subscribing to a buffer ring associated with the memory broker before the memory broker restart (510: YES), it may use the received information about the buffer ring to determine if it can identify a corresponding buffer ring in the temporary storage 172 (e.g., /dev/shm/) that is preserved in such failures or crashes (512) (i.e., one of the buffer rings put on probation). If the memory broker cannot identify a corresponding buffer ring in the temporary storage 172 (512: NO), it may determine that the buffer ring means was either not present in shared memory or was present but was determined to be invalid/corrupted and abandoned so the corresponding entry was deleted form temporary storage (as discussed above). The memory broker may then transmit instruction to abandon the buffer ring to the peer (514). The peer may then close the buffer ring information from its memory and unmap the associated memory region.

If the memory broker can identify a corresponding buffer ring in the temporary storage 172 and/or the data stores 175a-n (512: YES), the memory broker may add the peer to a channel associated with the buffer ring (516). For example, the memory broker may add the peer to the list of publishers/subscribers for that channel. In certain embodiments, if the peer is a subscriber, the memory broker may send subscribe notifications/information relating to all known buffer rings for the channel to the peer (e.g., SUBSCRIBE_TO messages). In some embodiments, if the memory broker can identify a corresponding buffer ring but there is no associated channel, the memory broker may identify a channel using information provided by the peer and associate the channel with the peer.

In certain embodiments, if the identified buffer ring is on probation and the peer is a publisher, the memory broker may remove the buffer ring from probation. The memory broker may then send notification to all known subscribers for that channel/buffer ring to inform them about the new buffer ring (e.g., SUBSCRIBE_TO messages). Certain subscribers may ignore such notification if they already know about the existence of the buffer ring, when, for example, when the memory broker is under state reconstruction and does not know that the subscribers already have knowledge of the new buffer ring.

In certain embodiments, if the identified buffer ring is on probation and the peer is a subscriber, the memory broker may not remove the buffer ring from probation. The memory broker may store subscriber information for buffer rings on probation, and may send abandon ring instructions if the buffer ring is later determined to be stale/corrupted.

The memory broker may also update (518) the buffer ring information/metadata in the corresponding record to include information about the peer e.g., list of publishers/subscribers), new connection, channel, and/or any other information included in the request received from the peer.

If the memory broker determines that the peer was not already publishing or subscribing to a buffer ring associated with the memory broker before the memory broker restart (510: NO), the memory broker may transmit a message to the peer (520). If the peer is a publisher, the memory broker may assign a new buffer ring to the peer and the transmitted message may include information relating to the assigned buffer ring (as discussed above with respect to FIG. 4). If the peer is a subscriber, the transmitted message may include information relating to one or more buffer rings/channels the subscriber can subscribe to (as discussed above with respect to FIG. 4).

The above process allows the memory broker to reconstruct to a state that existed before a crash or a failure based on information from the OS (e.g., temporary storage listing /dev/shm) and information provided by the peer as they reconnect to the memory broker. During state reconstruction, buffer rings may remain on probation until they are known to have at least one live publisher. The broker may also perform diagnostics testing by analyzing, for example, whether or not it has access to the shared memory, whether the header information is correct, etc.

Network Bridge

The above description relates to shared memory usage and management in a publish/subscribe messaging system with respect to a single network of a communications system. Specifically, the above description describes sharing of messages between publishers and subscribers on the same network. Often times, such publish/subscribe messaging systems are used in distributed computing systems that include a large number of networks or nodes on different networks. Such distributed computing systems should be able to handle large amounts of data and communications that are needed to effectively let disparate systems operate together and share information. The following disclosure describes systems and methods for sharing of data between networks of a distributed computing system using a publish-subscribe messaging system, and that prevents network congestion, redundancy, and latency commonly associated with such distributed systems.

Figure 6:
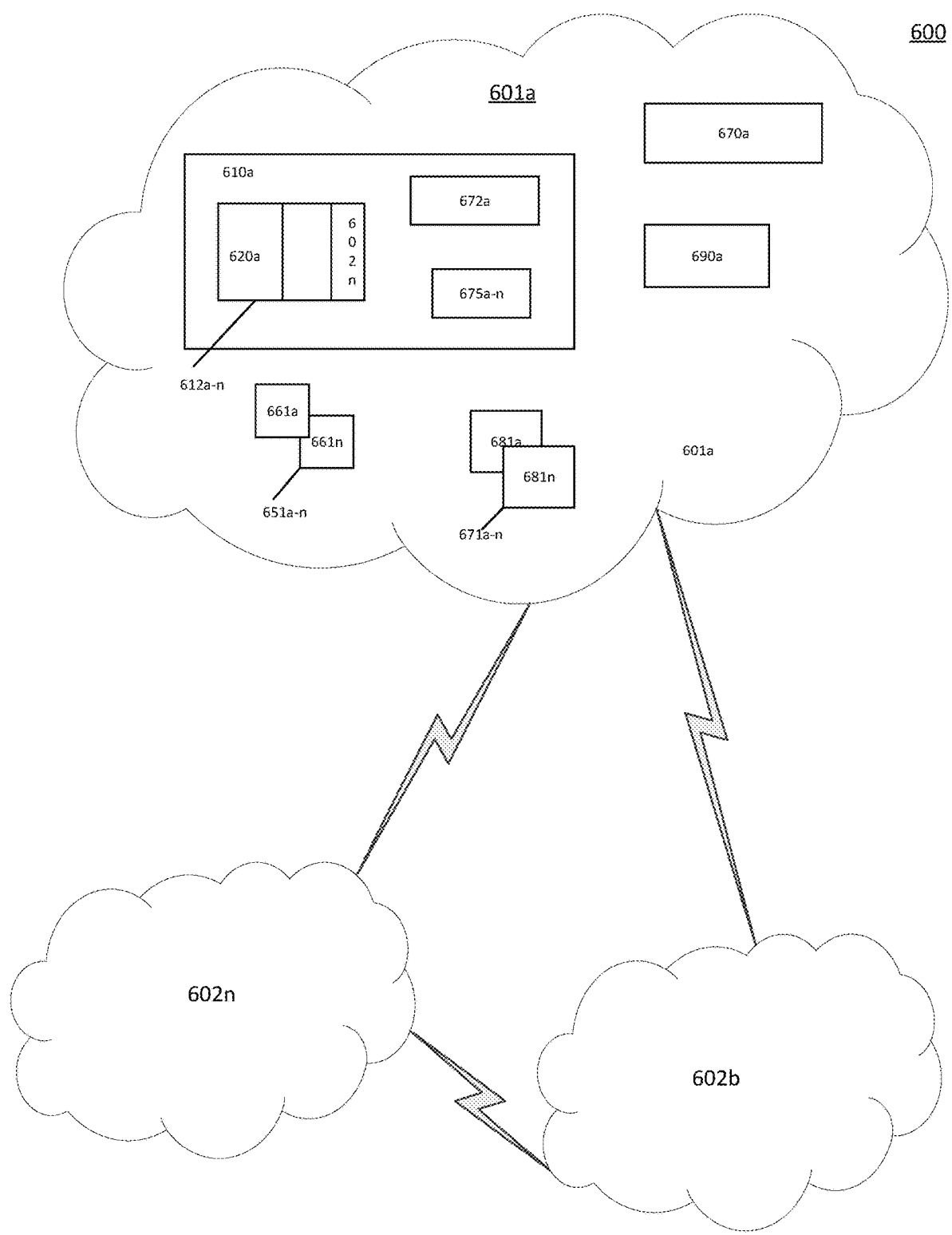
FIG. 6 illustrates is a schematic illustration of a publish/subscribe data communications system in a distributed computing system.

Referring now to FIG. 6, an example distributed computing system 600 architecture is illustrated. As shown in FIG. 6, the distributed computing system 600 may include network nodes 601a-n (or networks). Each network node 601a-n may include a shared memory 610a-n include memory regions 612a-n and buffer rings 620a-n. Each network node 601a-n may also include a memory broker 670a-n, temporary storage 672a-n, and data stores 675a-n. For each network node, one or more threads or computer processes 651a-n, 652a-n, . . . 653a-n, each including one or more publishers 661*a-n*, 662*a-n*, . . . 663*a-n*, have communicative access to the shared memory of that network node. Additionally one or more threads or computer processes 671*a-n*, 672*a-n*, . . . 673*a-n*, each including one or more subscribers 681*a-n*, 682*a-n*, . . . 683*a-n*, also has access to the shared memory of that network node. Each of these components in a network node have functionality/configuration as described above with respect to FIGS. 1-5.

Each network node 601*a-n* may also include a bridge module 690*a-n* (i.e., a software running on each node) configured to provide bridging between network nodes of the distributed computing system 600 to facilitate sharing of messages between such network nodes, as discussed below. Bridging connects two different networks or network nodes of the distributed computing system allowing them to communicate with each other as if they were a single network. Such may utilize various data transport protocols such as, without limitation, internet protocol (IP), transport control protocol (TCP), universal datagram protocol (UDP), stream control transmission protocol (SCTP), remote memory synchronization protocols such as remote direct memory access (RDMA) protocols, datagram congestion control protocol (DCCP), a switch, a router, or the like.

In certain embodiments, a bridge module may be included in the memory broker of a network node. Alternatively and/or additionally, a bridge module may run as a separate process on a network node. A bridge module may include a single process configured to perform all the tasks or multiple processes assigned to perform one or more of the bridge application's tasks.

Figure 7:
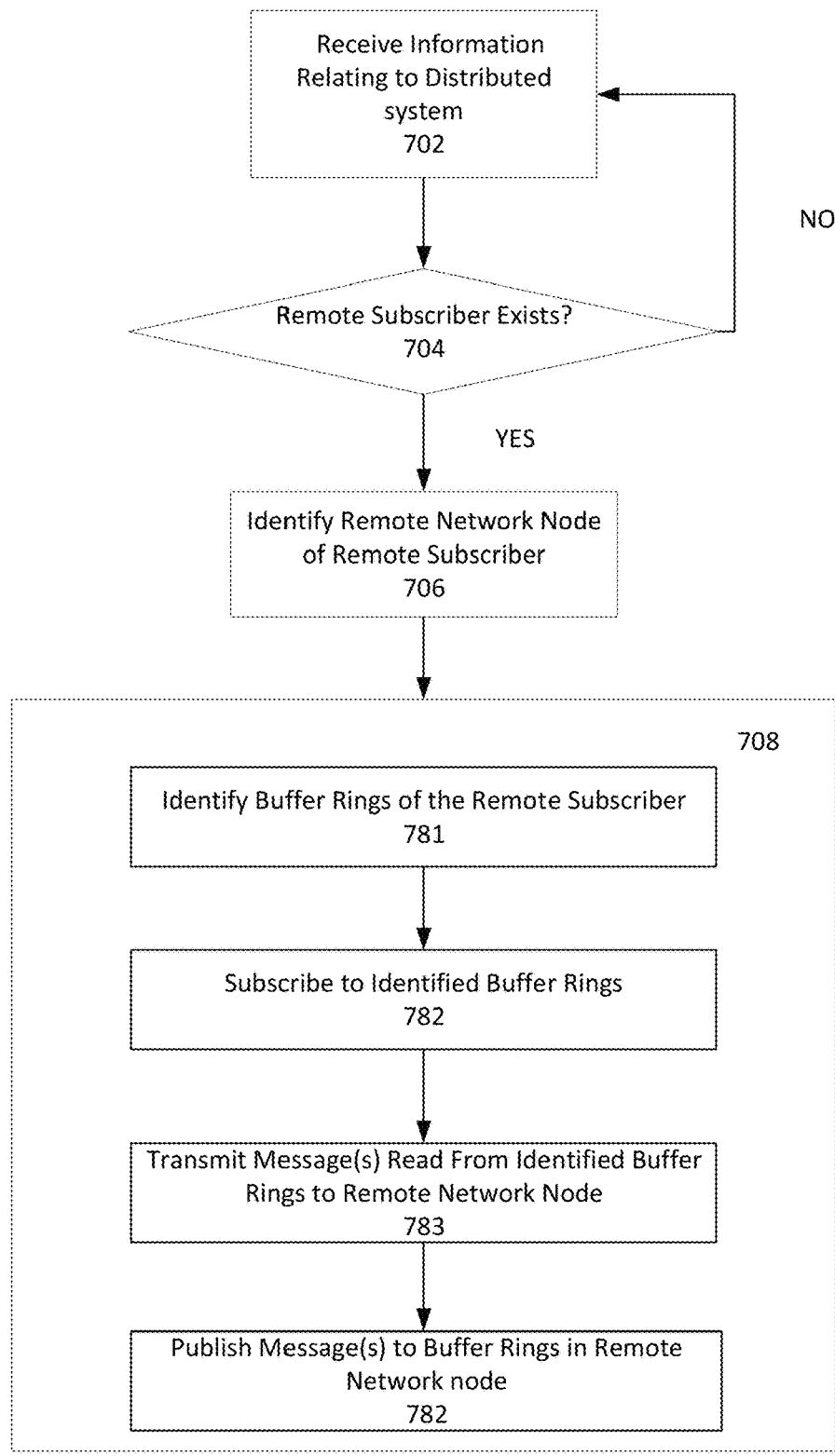
FIG. 7 is a flowchart illustrating an example method of transmission of messages between network nodes of a distributed computing system.

Referring now to FIG. 7, a flowchart illustrating an example method for sharing of information between network nodes of a distributed system is shown. At 702, a bridge module may receive information relating to the distributed system. In particular, the bridge module may receive information relating to existing channels and buffer rings in the distributed system, as well as the network locations of publishers and subscribers of existing channels. A bridge module may receive information about channels, buffer rings, publishers and subscribers that exist on the same network node as the bridge module (i.e., "local data") from, for example, a memory broker in bridge module's network (as discussed above, the memory brokers maintain and update channel information in data store 675*a-n*). Alternatively, a bridge module may subscribe to various notifications from shared memory, publisher(s), subscriber(s), data store(s), etc. in order to directly receive the local information.

A bridge module may receive information about channels, buffer rings, publishers and subscribers that exist on remote networks (i.e., "remote data") from other bridge modules (on other network nodes) in the distributed system. A bridge module may communicate with other bridge modules (e.g., for sharing information about which channels are published and subscribed to on their local nodes) in the distributed system through any suitable communication protocols such as, without limitation, TCP/IP, UDP/IP, Ethernet, SCTP, or the like. The system may use various synchronization methods for synchronizing data received by a bridge module from other bridge modules in the distributed system. Examples may include, without limitation, "eventually consistent" multi-node replication mechanisms, distributed consensus algorithms (e.g., Paxos™, Raft™, etc.), non-consensus based master-slave replication algorithms, or the like. For example, in an embodiment, each bridge module may be configured to be the "master" of its own subset of the data (i.e., local data), and each other bridge module may be a slave of that data. Therefore, all bridge modules are both masters and slaves, over different subsets of the synchronized data. In certain embodiments, the information about the existing channels, buffer rings, publishers, subscribers, and network locations of publishers and subscribers in the distributed system may be statistically configured (e.g., at start-up), and provided to the bridge modules if, for example, the information does not change during run-time.

At 704, the bridge module may use the received information to determine, for each existing channel/buffer ring on the bridge module's network ("local channel/local buffer ring"), whether there exist one or more subscribers on another network node ("remote subscribers"). If such remote subscribers exist (704: YES), a bridge module may identify the network node(s) (706) on which the remote subscribers exist ("remote node"). For each such remote node, the bridge module may execute bridging 708 (to connect with a bridge module of such remote node) to transmit data from local buffer ring(s) to the remote subscribers on that remote node. If such remote subscribers do not exist (704: NO), a bridge module may continue monitoring the distributed system by receiving information about it (702).

As shown in FIG. 7, for executing bridging (706) with a remote node, the bridge module may first identify the buffer ring(s)/channels(s) that have remote subscribers on the remote node (781). The bridge module may then subscribe to messages published on the identified buffer rings (782). The bridge module may transmit the messages read from the identified buffer rings to the remote node (783), and publish the messages to corresponding buffer rings in a shared memory of the remote node (784) for consumption by the remote subscribers on the remote node. In this manner, bridge modules act as "subscribers" on the local node where the publisher resides, and as "publishers" on the remote node(s) where the remote subscriber(s) reside. The bridge module may subscribe to buffer rings on the local node and publish to buffer rings on the remote node, using the methods and system described above.

It should be noted that for each buffer ring on the local node that the bridge module subscribes to, a corresponding and identical buffer ring is created in the shared memory of the remote node. Specifically, using the methods of the current disclosure, a copy of the buffer ring in the local node is created on the remote node by the bridge module. Publishers and subscribers remain unaware of each other's network nodes. Furthermore, data published to a buffer ring on a local node is transmitted to the remote node only once to create the buffer ring copy, regardless of the number of remote subscribers on the remote node.

The bridge module may use any of the above described network protocols (e.g., TCP, USP, SCTP, etc.) for transmitting data to the remote network (via the bridge module of the remote network node).

Alternatively and/or additionally, other network protocols may be used to execute bridging in a "zero copy" manner where a bridge module including a kernel network stack and/or network hardware (e.g., bridge, switch, router, etc.) may directly read messages from the buffer rings on the local node and write them to buffer rings on the remote node. In such scenarios, the system may preserve the integrity of the seqlock based synchronization and notification mechanisms discussed above by executing additional checks on seqlock counters associated with the buffer ring on the local node and the corresponding buffer ring copy on the remote node. At the local node, the bridge module may read the seqlock counter of the buffer ring both before and after a read operation, and transmit the values to bridge module of the remote node. At the remote node, the bridge module may obtain a write lock on the seqlock of the buffer ring copy, read the "before" seqlock value into local storage, read the message data directly into shared memory, read the "after" seqlock value, and compare "before" and "after" values; if there is any mismatch, the read was inconsistent and the destination message must be marked invalid. This process may be implemented using, for example, vectorized scatter commands, gather commands, I/O commands, or the like (similar to the lock free mechanism described above).

In some embodiments, the bridge module may prioritize or rank transmission and publication of messages associated with certain channels or buffer rings to the remote node over other channels or buffer rings. The bridge module may, therefore, configure and control the latency associated with the channels. The system may determine the latency based on, for example, importance of the topic of the buffer ring/channel, number of subscribers, number of publishers, or the like.

Figure 8:
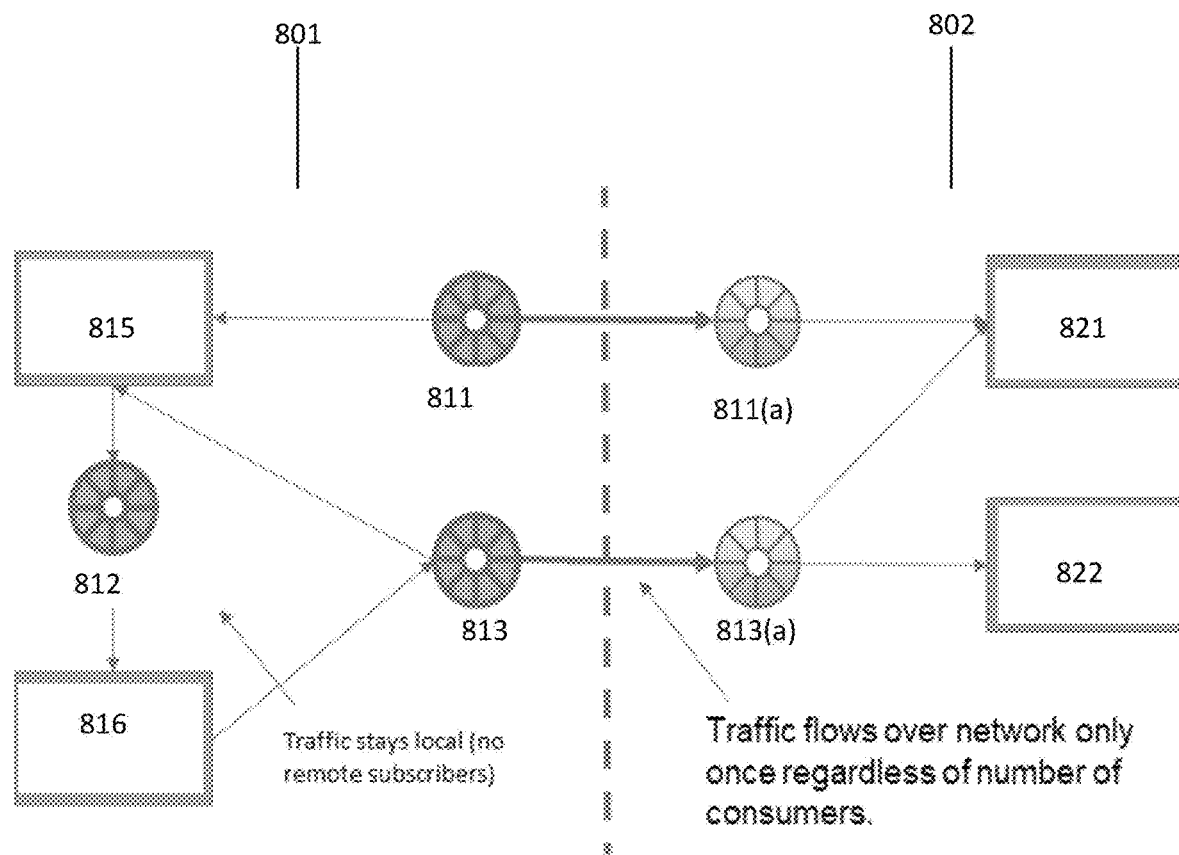
FIG. 8 is a schematic illustration of an example communications channel that has remote subscribers.

FIG. 8 illustrates the use of a network bridge for distribution of messages published by publishers on one node 801 to subscribers on another node 802. For example, as shown in FIG. 8, the node 801 may include buffer ring 811 that stores data relating to processed LiDAR data, buffer ring 812 that stores data relating to observed poses, and buffer ring 813 that stores data relating to filtered poses. A LiDAR data processing system (not shown but on 801) may publish data to buffer ring 811. LiDAR data subscribers such as a scan matcher 815 (on node 801) and a tracker 821 (on not 802) may subscriber to data in buffer ring 811. The scan matcher 815 may publish data to the buffer ring 812, and a pose filter 816 may subscribe to the published data in the buffer ring 812. The pose filter 816 may publish data to the buffer ring 813, and multiple subscribers such as the scan matcher 815 (on node 801), the tracker 821 (on node 802), or other systems 822 (on node 802) may subscribe to data on the buffer ring 813.

Subscribers of a channel/buffer ring that exist on the same network node as a publisher of that channel may read messages from a buffer ring in shared memory of that network node, as described above. For example, scan matcher 815 on node 801 subscribing to buffer rings 811 and 813, and pose filter 816 subscribing to buffer ring 812 read messages from the respective buffer rings using the methods discussed above. However, when the subscriber of a channel exists on a different network node from that of the publisher of that channel, the bridge module on the publisher's network node may create a execute bridging to create a copy of the buffer ring on the subscriber's network node 802 (as described above), and all the subscribers on network node 802 may read data published to the buffer ring by accessing buffer ring copy. This bridging is transparent to the peers. For example, the bridge module (not shown here) on network node 801 may create a copy 811(a) of the buffer ring 811 on network node 802, and tracker 821 on node 802 subscribing to buffer ring 811 may read data from the buffer ring copy 811(a). Similarly, the bridge module on network node 801 may create a copy 813(a) of the buffer ring 813 on network node 802, and tracker 821 and/or other subscribers 822 on node 802 subscribing to buffer ring 813 may read data from the buffer ring copy 813(a). In this way the distributed system including multiple network nodes may present a unified publish/subscribe messaging system in which subscribers attached to different nodes can receive publication messages unaware of the node to which the publisher was connected.

Figure 9:
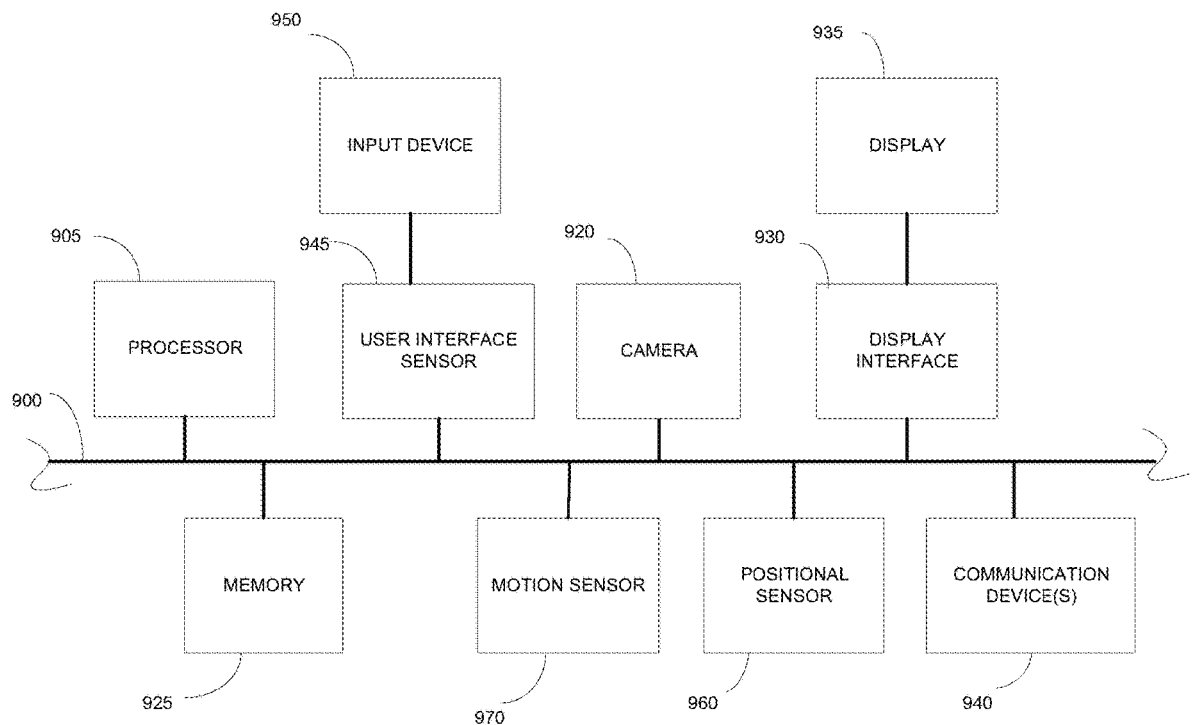
FIG. 9 is a block diagram of elements of a computing device on which the various systems and methods in this document could be implemented.

FIG. 9 depicts an example of internal hardware that may be included in any of the electronic components of the system, such as internal processing systems, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format. An audio interface and audio output (such as a speaker) also may be provided. Communication with external devices may occur using various communication devices 940 such as a wireless antenna, an RFID tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard, a mouse, a joystick, a touchscreen, a touch pad, a remote control, a pointing device and/or microphone. Digital image frames also may be received from a camera 920 that can capture video and/or still images.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" or "communicatively coupled" if the devices are able to send and/or receive data via a communication link. "Electronic communication" refers to the transmission of data via one or more signals between two or more electronic devices, whether through a wired or wireless network, and whether directly or indirectly via one or more intermediary devices.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

The term "subscriber" as used herein includes, for example, a remote subscriber; a local subscriber, a remote client, a local client, a subscriber implemented using a Virtual Machine (VM), a subscriber implemented using hardware components and/or software components, a subscriber implemented using a client device or a client computer, or the lik The term "publisher" as used herein includes, for example, a remote publisher, a local publisher, a remote server, a local server, a publisher implemented using a Virtual Machine (VM), a publisher implemented using hardware components and/or software components, a publisher implemented using a publisher device or a publisher computer, or the like.

In this document, when relative terms of order such as "first" and "second" are used to modify a noun, such use is simply intended to distinguish one item from another, and is not intended to require a sequential order unless specifically stated.

An "automated device monitoring system" is a set of hardware that is communicatively and/or electrically connected to various components (such as sensors) of an automated device to collect status or operational parameter values from those components. An automated device monitoring system may include or be connected to a data logging device that includes a data input (such as a wireless receiver) that is configured to receive device operation data directly or indirectly from the device's components. The monitoring system also may include a processor, a transmitter and a memory with programming instructions. A monitoring system may include a transmitter for transmitting commands and/or data to external electronic devices and/or remote servers. In various embodiments, a monitoring system may be embedded or integral with the automated device's other computing system components, or it may be a separate device that is in communication with one or more other local systems, such as, for example in the context of an autonomous vehicle, an on-board diagnostics system.

What is claimed is:

1. A system for providing lockless access to a buffer ring, the system comprising:
    a shared memory comprising:
        the buffer ring, the buffer ring comprising:
            a plurality of sequentially arranged fixed size buffers configured to store messages, and
            a global header comprising a counter and a lock, and
        a synchronization data storage region corresponding to each of the plurality of fixed sized size buffers, wherein the synchronization data storage region corresponding to a fixed size buffer comprises a buffer counter that indicates accuracy of a message read from that fixed size buffer by a subscriber;
    a publisher configured to write a plurality of messages to the plurality of fixed sized buffers in the buffer ring; and
    the subscriber configured to read one or more of the plurality of messages written by the publisher,
    wherein the counter provides information relating to a fixed size buffer in the buffer ring to which the publisher will next write a message.

2. The system of claim 1, wherein a negative value of the counter is indicative of a state of the system in which the buffer ring does not include any messages.

3. The system of claim 2, wherein the publisher is further configured to assign a value of 0 to the counter upon completion of a first write to the ring buffer.

4. The system of claim 3, wherein the publisher is further configured to increase the value of the counter after each subsequent operation such that an index of the fixed size buffer in the buffer ring to which the publisher most recently wrote a message is determined by dividing a value of the counter by 2.

5. The system of claim 1, wherein:
the lock is acquired by the publisher before executing a write to one of the plurality of fixed size buffers; and
the lock is released by the publisher after execution of the write.

6. The system of claim 5, further comprising:
a plurality of publishers, each of the plurality of publishers configured to write one or more messages to the plurality of fixed sized buffers in the buffer ring; and
wherein the lock can be acquired by a single one of the plurality of publishers at any given time.

7. The system of claim 1, wherein each of the plurality of messages has a finite size.

8. The system of claim 1, wherein the plurality of fixed size buffers do not share cache lines with each other in the shared memory.

9. The system of claim 1, wherein each of the plurality of fixed size buffers comprises a buffer header configured to store at least one of the following: a buffer index number, synchronization information, or buffer state information.

10. The system of claim 9, wherein the buffer header occupies a unique cache line in the shared memory.

11. The system of claim 10, wherein each of the plurality of fixed size buffers further comprises a data region that starts in a cache line of the shared memory immediately following the unique cache line of a corresponding buffer header.

12. The system of claim 1, wherein a memory address of the synchronization data storage region is included in a buffer header of that fixed sized buffer.

13. The system of claim 1, wherein:
an initial value of the buffer counter is set to 0; and
the publisher is configured to, for execution of a write to that fixed size buffer, increment a value of the buffer counter before the execution of the write and after the execution of the write.

14. The system of claim 13, wherein the subscriber is configured to:
compare a first value of the buffer counter before execution of a read from that fixed size buffer with a second value of the buffer counter after execution of the read from that fixed size buffer; and
discard a message read from that fixed size buffer if the first value does not match the second value.

15. The system of claim 1, wherein a value of the buffer counter is odd during execution of a write to that fixed sized buffer by the publisher.

16. The system of claim 15, wherein the subscriber is configured to wait for a notification of completion of the write being executed when the value of the buffer counter is odd before executing a read on that fixed size buffer.

17. The system of claim 1, wherein the data synchronization region further comprises a futex system call that is configured to send a new message notification to the subscriber when a value of the buffer counter increments by 2 and is even.

18. The system of claim 1, wherein the data synchronization region further comprises a futex system call that is configured to send a wait notification to the subscriber when a value of the buffer counter is either odd or has not incremented.

19. The system of claim 1, wherein the data synchronization region further comprises a futex system call that is configured to send a wait notification to a plurality of publishers in the system when a value of the buffer counter is odd.

20. The system of claim 1, wherein a size of the plurality of fixed size zones is determined based on at least one of the following: maximum message size, maximum number of fixed size zones, or alignment.

21. A method for enabling message transfer between a publisher and a subscriber, the method comprising, by a processor:
generating, in a shared memory:
a data structure comprising a buffer ring, the buffer ring comprising:
a plurality of sequentially arranged fixed size buffers configured to store messages, and
a global header comprising a seqlock, wherein the seqlock includes a seqlock counter that provides information relating to a fixed size buffer in the buffer ring to which the publisher will next write a message; and
a synchronization data storage region corresponding to each of the plurality of fixed sized size buffers, the synchronization data storage region comprising a buffer counter that indicates accuracy of a message read from that fixed size buffer by the subscriber.

22. The method of claim 21, wherein a negative value of the seqlock counter is indicative of a state of the system in which the buffer ring does not include any messages.

23. The method of claim 22, further comprising, by the publisher, assigning a value of 0 to the counter upon completion of a first write to the ring buffer.

24. The method of claim 23, further comprising, by the publisher, increasing the value of the counter after each subsequent operation such that an index of the fixed size buffer in the buffer ring to which the publisher most recently wrote a message is determined by dividing a value of the counter by 2.

25. The method of claim 21, wherein:
the lock is acquired by the publisher before executing a write to one of the plurality of fixed size buffers; and
the lock is released by the publisher after execution of the write.

26. The method of claim 21, wherein the plurality of fixed size buffers do not share cache lines with each other in the shared memory.

27. The method of claim 21, wherein each of the plurality of buffers comprises a buffer header configured to store at least one of the following: a buffer index number, synchronization information, or buffer state information.

28. The method of claim 27, wherein the buffer header occupies a unique cache line in the shared memory.

29. The method of claim 28, wherein each of the plurality of buffers further comprises a data region that starts in a cache line of the shared memory immediately following the unique cache line of a corresponding buffer header.

30. The method of claim 21, wherein a memory address of the synchronization data storage region is included in a buffer header of that fixed sized buffer.

31. The method of claim 21, wherein:
an initial value of the buffer counter is set to 0; and
the publisher is configured to, for execution of a write to that fixed size buffer, increment a value of the buffer counter before the execution of the write and after the execution of the write.

32. The method of claim 31, further comprising, by the subscriber:
- comparing a first value of the buffer counter before execution of a read from that fixed size buffer with a second value of the buffer counter after execution of the read from that fixed size buffer; and
- discarding a message read from that fixed size buffer if the first value does not match the second value.

33. The method of claim 21, wherein a value of the buffer counter is odd during execution of a write to that fixed sized buffer by the publisher.

34. The method of claim 33, further comprising, by the subscriber, waiting for a notification of completion of the write being executed when the value of the buffer counter is odd before executing a read on that fixed size buffer.

* * * * *